(12) United States Patent
Kim et al.

(10) Patent No.: US 10,643,504 B2
(45) Date of Patent: May 5, 2020

(54) ELECTRONIC DEVICE

(71) Applicant: LG ELECTRONICS INC., Seoul (KR)

(72) Inventors: Jonguk Kim, Seoul (KR); Youngkuk Kwon, Seoul (KR); Jaeho An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 15/685,633

(22) Filed: Aug. 24, 2017

(65) Prior Publication Data
US 2018/0061283 A1    Mar. 1, 2018

(30) Foreign Application Priority Data

Aug. 26, 2016   (KR) .................. 10-2016-0109106

(51) Int. Cl.
| | | |
|---|---|---|
| *G09F 9/35* | (2006.01) | |
| *G09F 23/06* | (2006.01) | |
| *A47F 11/06* | (2006.01) | |
| *G06F 3/147* | (2006.01) | |
| *G09F 23/04* | (2006.01) | |
| *G09G 3/36* | (2006.01) | |
| *G02F 1/1333* | (2006.01) | |

(Continued)

(52) U.S. Cl.
CPC ............. *G09F 9/35* (2013.01); *A47F 3/001* (2013.01); *A47F 3/0434* (2013.01); *A47F 3/0486* (2013.01); *A47F 11/06* (2013.01); *G02B 6/0091* (2013.01); *G02F 1/133308* (2013.01); *G06F 3/147* (2013.01); *G09F 9/30* (2013.01); *G09F 23/04* (2013.01); *G09F 23/06* (2013.01); *G09G 3/3607* (2013.01); *G02B 6/0095* (2013.01); *G09F 2023/0033* (2013.01)

(58) Field of Classification Search
None
See application file for complete search history.

(56) References Cited

U.S. PATENT DOCUMENTS

| 2011/0128223 A1 * | 6/2011 | Lashina ................. G06F 3/013 345/158 |
|---|---|---|
| 2014/0144083 A1 | 5/2014 | Artwohl et al. |

(Continued)

FOREIGN PATENT DOCUMENTS

| EP | 3053487 A1 | 8/2016 |
|---|---|---|
| JP | 2009-125311 A | 6/2009 |
| KR | 10-2015-0008646 A | 1/2015 |

*Primary Examiner* — Matthew Yeung
(74) *Attorney, Agent, or Firm* — Birch, Stewart, Kolasch & Birch, LLP

(57) ABSTRACT

An electronic device including a main body; a door attached to the main body; an observation window provided in at least a partial area of the door, the observation window including a display panel; at least one internal light source located within the observation window; at least one external light source located at an area outside of the observation window; and a controller configured to operate a first state to turn on the at least one internal light source such that an image displayed on the display panel is viewable from an outside of the electronic device, and operate a second state to turn on the at least one external light source such that an inside of the electronic device is viewable from the outside of the electronic device.

9 Claims, 32 Drawing Sheets

(51) Int. Cl.
*G09F 9/30* (2006.01)
*F21V 8/00* (2006.01)
*A47F 3/00* (2006.01)
*A47F 3/04* (2006.01)
*G09F 23/00* (2006.01)

(56) References Cited

U.S. PATENT DOCUMENTS

| | | | |
|---|---|---|---|
| 2014/0232958 A1* | 8/2014 | Venturas | G02F 1/133308 349/12 |
| 2015/0170608 A1* | 6/2015 | Kim | G09G 5/14 345/592 |
| 2015/0226988 A1* | 8/2015 | Chen | G02F 1/1334 349/12 |
| 2016/0220039 A1 | 8/2016 | Chang et al. | |

\* cited by examiner (a) (b)

(a)

(b)

(a)

(b)

(a)

(b)

(a)

(b)

ELECTRONIC DEVICE

This application claims the benefit of Korean Patent Application No. 10-2016-0109106 filed on Aug. 26, 2016, the entire contents of which are incorporated herein by reference for all purposes as if fully set forth herein.

BACKGROUND OF THE INVENTION

Field of the Invention

The present invention relates to an electronic device.

Discussion of the Related Art

In general, a showcase refrigerator is a representative electronic device that is essentially used at a home, a restaurant, and a convenience store and can store a product at the inside and display to sell a product at the outside. Nowadays, a showcase refrigerator that can implement an image is formed in a structure having a liquid crystal cell that can implement and reproduce various images at a front surface thereof, i.e., a transparent window of a door to output an image with a three-dimensional effect and can thus represent a demonstration effect through an advertisement image together with an object housed therein.

SUMMARY OF THE INVENTION

In accordance with an aspect of the present invention, an electronic device includes: a main body; a door attached to a front surface of the main body; at least one light source disposed in at least a portion of a corner area of the door; an observation window provided in at least a partial area of the door; and a controller that selectively drives at least one of the at least one light source, wherein the controller is in any one state of a first state that drives a light source located within the observation window among the at least one light source and a second state that drives a light source located at the outside of the observation window among the at least one light source.

The controller may change the first state to the second state, when an object approaches a front surface of the observation window The controller may change the second state to the first state, when the object, having approached the observation window does not move while a predetermined time has elapsed.

The controller may further drive a portion of a light source located within the observation window in the second state.

The controller may further drive the at least one light source located within the observation window in the second state, and brightness of the at least one light source located within the observation window in the second state may be darker than that of the at least one light source located within the observation window in the first state.

Brightness of the at least one light source located within the observation window in the second state may be darker by 10% or more than that of the at least one light source located within the observation window in the first state.

The light source may exist in the plural, at least one of the plurality of light sources may be located at the corner area within the observation window, and at least another one of the plurality of light sources may be located at a side surface of the main body of the outside of the observation window.

The light source may exist in the plural, at least one of the plurality of light sources may be located at the corner area within the observation window, and at least another one of the plurality of light sources may be located at a side surface of the door of the outside of the observation window.

The light source may exist in the plural, at least one of the plurality of light sources may be located at the corner area within the observation window, and at least another one of the plurality of light sources may be located at a side surface of the door of the outside of the observation window and a side surface of the main body of the outside of the observation window.

The electronic device may further include a display panel located between the light guide plate and an external area of the main body and that displays an image according to a control signal of the controller.

The controller may further drive the at least one light source located within the observation window in the second state, and the display panel may display a white image.

The controller may further drive the at least one light source located within the observation window in the second state, and a portion of the display panel may display a white image.

The brightness of the external light source of the observation window when the door is opened may be darker than that of the external light source of the observation window when the door is closed.

The brightness of the external light source of the observation window when the door is opened may be darker by 5% or more than that of the external light source of the observation window when the door is closed.

At least one light source of the external light source of the observation window when the door is opened may have brightness different from that of at least another one light source located at the opposite side.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
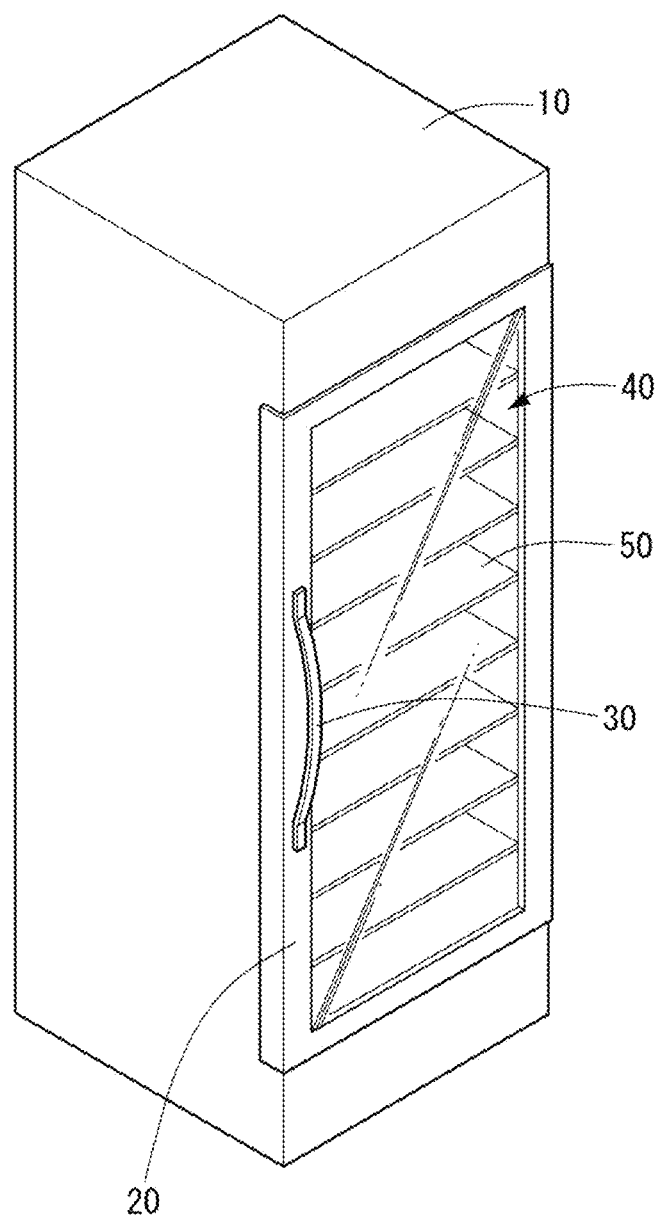
FIGS. 1 to 17 are views illustrating an electronic device according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component. The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

FIGS. 1 to 17 are views illustrating an electronic device according to an embodiment of the present invention. Referring to FIG. 1, an electronic device 100 may include a main body 10, a door 20, a handle 30, an observation window 40, and at least one shelf 50. The main body 10 may have a cuboid shape such as a hollow cuboid shape. The main body 10 can also store a material therein and the inside can be cooled by a cooling device. Accordingly, a material stored within the main body 10 can be stored for a long period.

At a front surface of the main body 10, the door 20 is provided. The door 20 can also have a cuboid shape. Specifically, an edge of the door 20 includes a frame and at a central portion thereof, the observation window 40 is included. A hinge shaft for hinge coupling to the main body 10 can be located at a vertical portion of at least one side of the frame of the door 20. The hinge shaft can protrude to the outside of the vertical portion of at least one side of the door 20 and be coupled to the main body 10 to support the door 20.

In addition, the observation window 40 is located in at least a partial area of the door 20. Specifically, the observation window 40 is located at a central portion of the door 20 and can include a transparent material. Accordingly, the observation window 40 allows a user to see an object stored on the inside. Further, the observation window 40 may include a transparent liquid crystal display (LCD) or a transparent Active Matrix Organic Light Emitting Diode (AMOLED). The observation window 40 can also protect an object stored at the inside from an external impact. At a front surface of the observation window 40, a touch panel may also be provided. A detailed description of an internal structure of the observation window 40 will be described later.

The handle 30 can be located at a central portion of one side of the door 20. As shown, both ends of the handle 30 contact the door 20 and a central portion thereof is separated from the door 20. Accordingly, a user can easily hold the handle 30 to separate the door 20 from the main body 10. A touch sensor can also be provided at a front surface of the handle 30.

In addition, the inside of the main body 10 may be partitioned with at least one shelf 50. The at least one shelf 50 can also have a cuboid shape and provide a space to put objects to store within the main body 10. The at least one shelf 50 can also be coupled to portions protruded to both ends within the main body 10.

Figure 2:
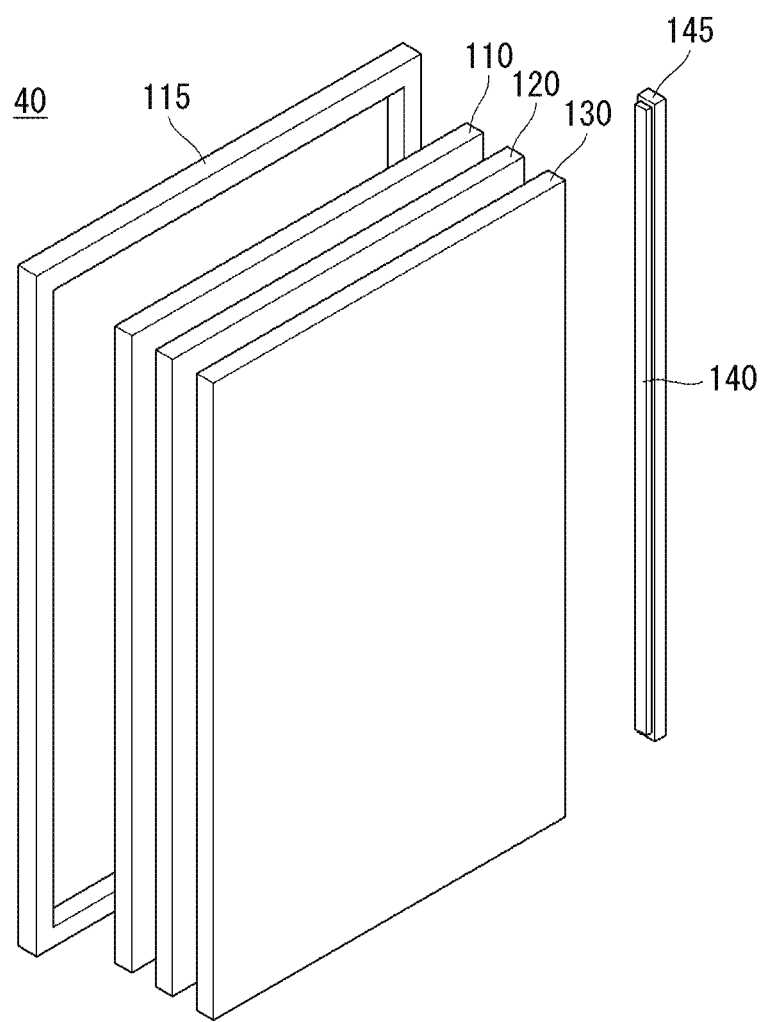

Referring to FIG. 2, the observation window 40 can be coupled to an internal edge of the frame of the door 20. The observation window 40 may also include a top case 115, a front glass 110, a display panel 120, rear glass 130, and/or a light source 140.

The display panel 120 can be located between the front glass 110 and the rear glass 130. Further, the front glass 110 can display an image of the display panel 120 to the outside. The display panel 120 can also divide an image into a plurality of pixels to output the image to correspond to a color, brightness, and chroma per each pixel. In addition, the display panel 120 can be divided into an active area that displays an image and an inactive area that does not display an image. The display panel 120 may also include a front substrate and a rear substrate opposite to each other with a liquid crystal layer interposed therebetween.

In addition, the front substrate may include a plurality of pixels formed with red R, green G, and blue B sub pixels and can generate an image corresponding to a red color, a green color, or a blue color according to a control signal. Further, the rear substrate may include switching elements for switching a pixel electrode. For example, the pixel electrode can change a molecule arrangement of the liquid crystal layer according to a control signal applied from the outside. That is, the liquid crystal layer includes a plurality of liquid crystal molecules that change an arrangement to correspond to a voltage difference that has occurred between a pixel electrode and a common electrode. The liquid crystal layer also transfers light provided from the light source 140 to the front substrate.

In addition, the light source 140 can emit light between the display panel 120 and the rear glass 130 at a side surface. For example, the light source 140 can be a Light Emitting Diode (LED) chip or an LED package including at least one LED chip. Further, the light source 140 can be disposed at a predetermined gap on a substrate 145. However, the present invention is not limited thereto and the light source 140 can be disposed in a straight line without a gap on the substrate 145. The substrate 145 may also be a Printed Circuit Board (PCB) that mounts at least one light source 140.

The light source 140 can include a color LED that emits at least one of a red color, a blue color, and a green color or a white LED. The color LED may include at least one of a red LED, a blue LED, and a green LED. The light source 140 may also be a Chip On Board (COB) type. The COB type light source directly couples an LED chip, which is a light source to the substrate 145. Therefore, a process can be simplified.

Further, a resistance can be lowered and thus energy to be lost due to a heat can be reduced. That is, the power efficiency of the light source 140 can be enhanced. The COB type light source can also provide brighter lighting and be implemented in a smaller thickness and a lighter weight than a related art light source.

Figure 3:
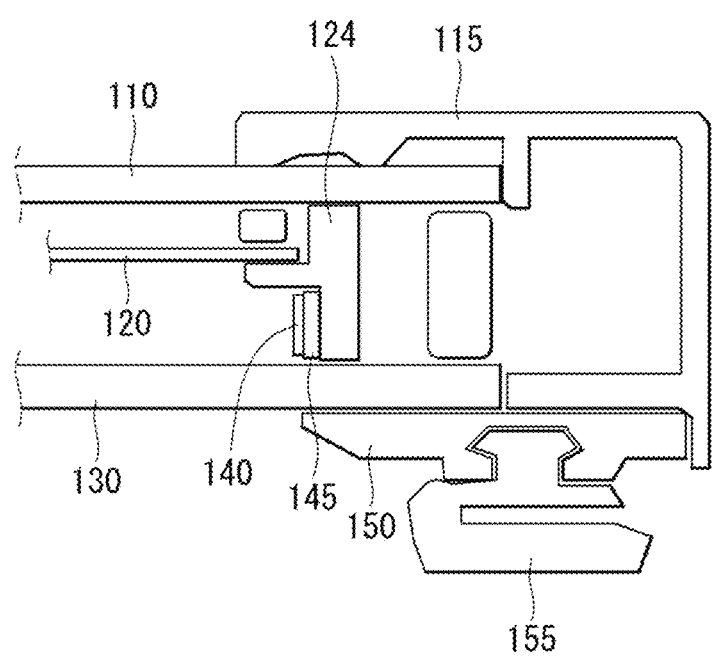

Referring to FIG. 3, the front glass 110 and the rear glass 130 are fixed by the top case 115 and a rear frame 150. That is, the front glass 110 and the rear glass 130 can be directly coupled to the top case 115 and the rear frame 150. Alternatively, the front glass 110 and the rear glass 130 can be coupled to a structure coupled on the top case 115 and the rear frame 150. That is, the front glass 110 and the rear glass 130 can be indirectly coupled to the top case 115 and the rear frame 150.

In addition, the top case 115 can be divided into a front cover and a side cover. That is, the top case 115 can be divided into a front surface cover located at the front surface side of the display panel 120 and a side surface cover located at the side surface side of the display panel 120. Further, the front surface cover and the side surface cover can be separately formed, and one of the front surface cover and the side surface cover can be omitted. For example, for an enhanced design, only the side surface cover may exist without the front surface cover.

In addition, the top case 115 may cover at least a partial area of a front surface and a side surface of the display panel 120. For example, the top case 115 may have a quadrangular frame shape whose center is hollow. Because the center of the front cover is hollow, an image of the display panel 120 can be displayed to the outside.

Further, the rear frame 150 is located opposite to the front cover of the top case 115 and can be coupled to the top case 115 to fix the observation window 40. The rear frame 150 can also be coupled to a rubber gasket 155. That is, the rubber gasket 155 can couple the door 20 and the main body 10. As shown, the rubber gasket 155 includes a depressed portion at a central portion, thereby being easily contracted and relaxed. For example, when the door 20 and the main body 10 are coupled, the rubber gasket 155 is contracted, and when the door 20 and the main body 10 are separated, the rubber gasket 155 is relaxed.

Also, the guide panel 124 is located to fix the display panel 120 between the front glass 110 and the rear glass 130. The guide panel 124 guides a location of the display panel 120 and can be directly fixed to the display panel 120. Alternatively, the guide panel 124 can be fixed to the display panel 120 through a mold. The guide panel 124 can also couple the display panel 120 on a portion protruded in a lengthwise direction of the display panel 120.

In addition, the substrate 145 is located at a side surface of a low portion of the protruded portion of the guide panel 124. The light source 140 is also located on the substrate 145 to emit light at a side surface.

Figure 4:
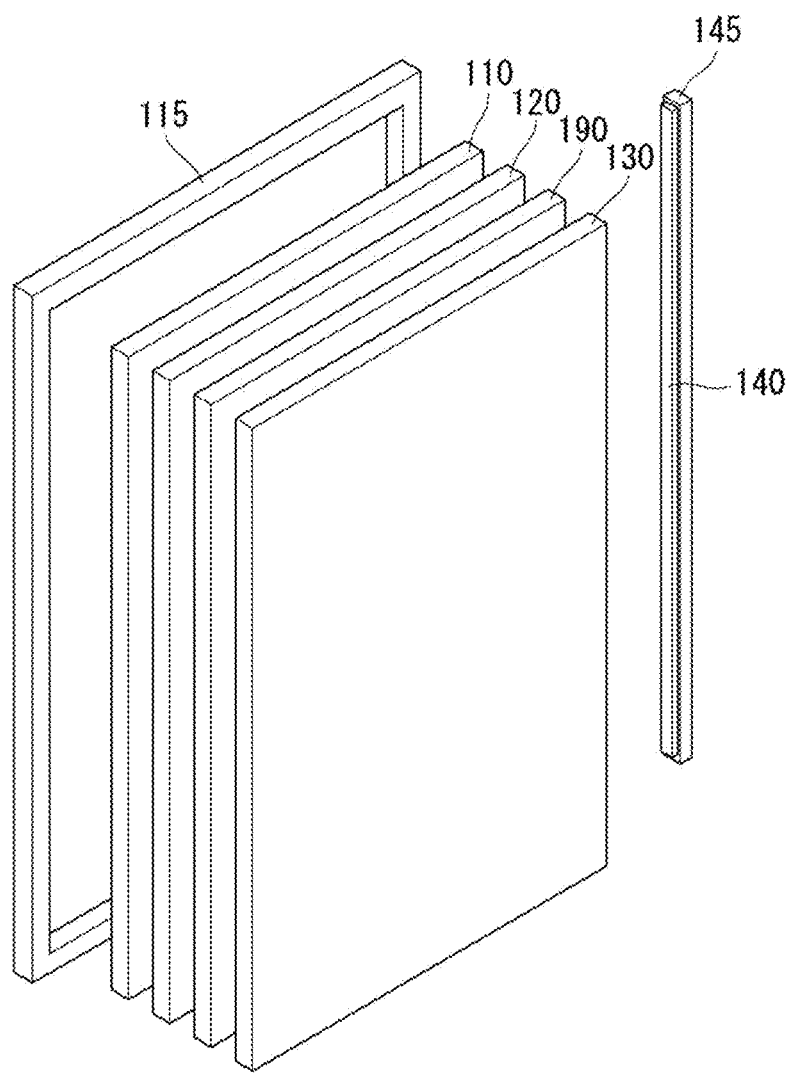
Figure 5:
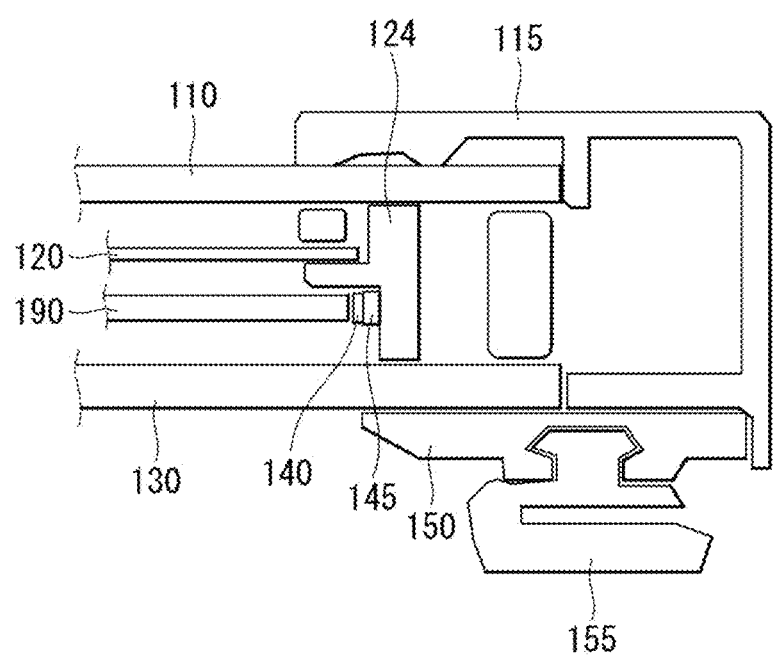
Figure 6:
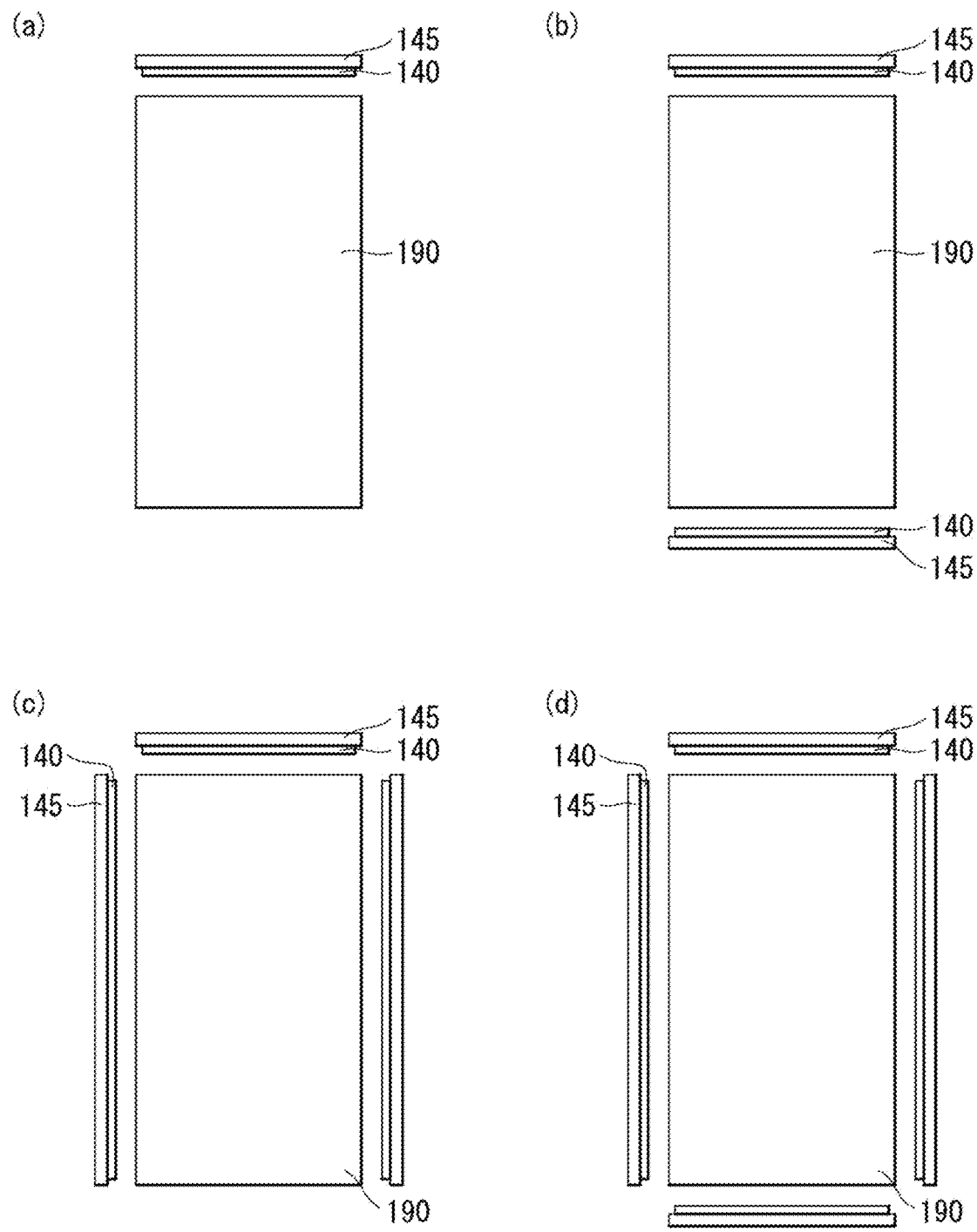

Referring to FIGS. 4 and 5, the observation window 40 may further include a light guide plate 190 overlapped with at least a partial area of an observation window assembly. Specifically, the light guide plate 190 is located between the display panel 120 and the rear glass 130. The light guide plate 190 may also include an acryl-based material. In order to well diffuse light, the light guide plate 190 may include a dispersing agent. Further, the light source 140 can emit light to a side surface of the light guide plate 190.

In addition, the light guide plate 190 is located between an internal area of the main body 10 of a first brightness and an external area of the main body 10 of a second brightness. Specifically, the light guide plate 190 is located at a lower portion of a protruded portion of the guide panel 124 and is located at a location corresponding to the display panel 120.

In this instance, the light source 140 is located in only at least one side surface of an area in which the light guide plate 190 is located. That is, the light source 140 is located at a corner area of the light guide plate 190. Accordingly, the light source 140 does not emit light to a portion, except for the light guide plate 190.

Referring to FIG. 6(a), the light source 140 is located at an upper surface instead of at least one side surface of the light guide plate 190. However, the present invention is not limited thereto and the light source 140 may be located at a lower surface of the light guide plate 190.

Referring to FIG. 6(b), the light source 140 is located at both an upper surface and a lower surface of the light guide plate 190. Because a length of a vertical surface of the light guide plate 190 is longer than that between a side surface thereof, when the light source 140 is located at only an upper surface, light advancing to the central portion is reduced. Accordingly, the light source 140 is located at an upper surface and a lower surface of the light guide plate 190 and thus light advancing to the central portion can fully exist.

Referring to FIG. 6(c), the light source 140 is located at one side surface, an upper surface, and a lower surface of the light guide plate 190. Because the light source 140 is located at only a vertical portion of the light guide plate 190, a drawback of the light guide plate 190 having a long vertical portion can be compensated. Referring to FIG. 6(d), the light source 140 is located at an entire surface of the light guide plate 190. Accordingly, light can be easily diffused to the entire light guide plate 190.

Figure 7:
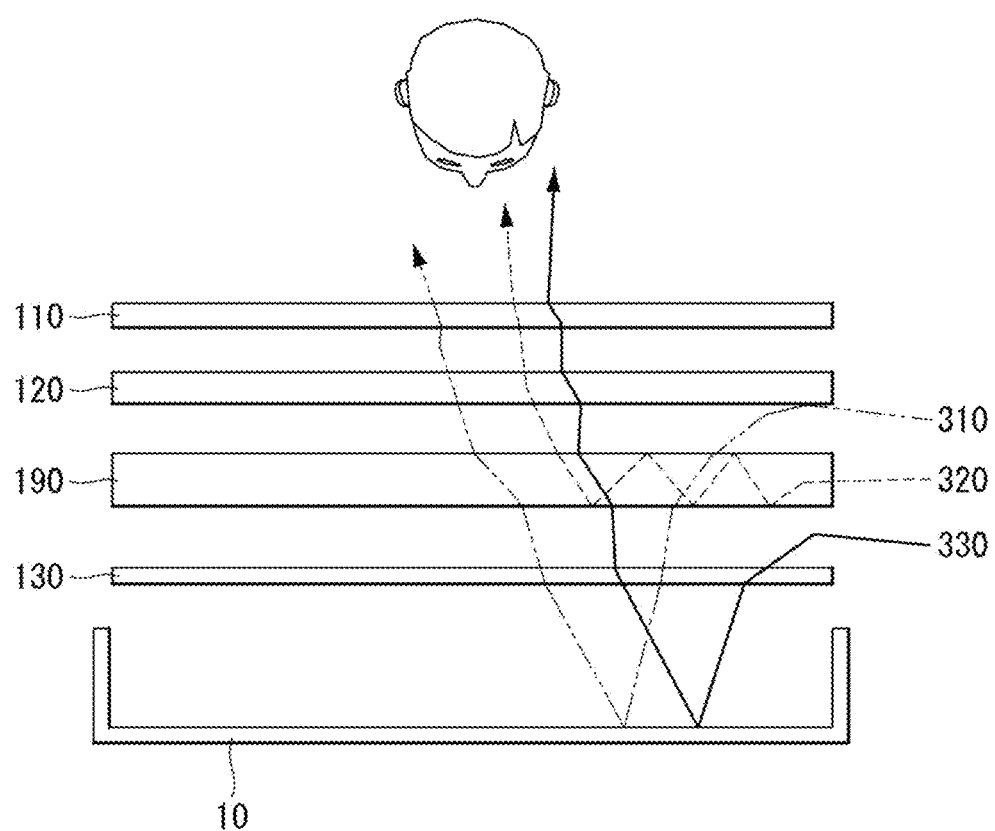
Figure 8:
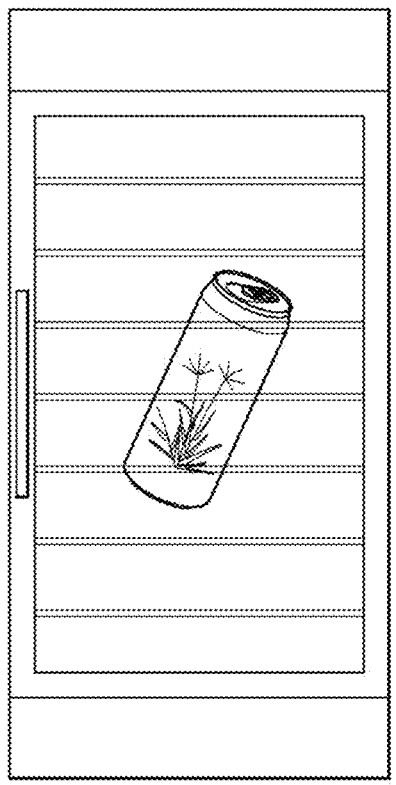
Figure 8:
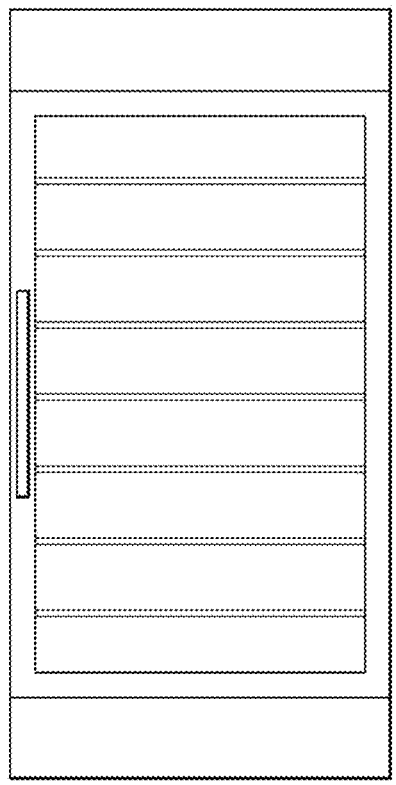

Referring to FIG. 7, when light 320 is emitted to the inside of the light guide plate 190, the light does not advance to a lower portion of the light guide plate 190 by total reflection. Accordingly, when the user views the display panel 120, the user does not see a shape within the main body 10.

Alternatively, when light 310 and 330 is not emitted to the inside of the light guide plate 190, at least partial light can be refracted and reflected at the inside of the main body 10. Accordingly, when the user views the display panel 120, the user can see a shape within the main body 10.

When light is emitted to the inside of the light guide plate 190 and when light is emitted to the outside of the light guide plate 190, light of a third brightness larger than a first brightness can be projected to an external area of the main body. When light 320 is emitted to the inside of the light guide plate 190, the electronic device according to an embodiment of the present invention may not determine a shape within the main body 10. Accordingly, the user can concentrate more at a screen displayed on the display panel 120.

Referring to FIG. 8(a), when light 310 and 330 is not emitted to the inside of the light guide plate 190 (FIG. 7), the user can simultaneously view an image or a picture displayed on the observation window 40 and an object stored within the main body 10. Accordingly, the user can easily see an object stored within the main body 10 while viewing the advertisement.

However, when light 310 and 330 to be described later is not emitted to the inside of the light guide plate 190, an image is hardly displayed on the observation window 40, and in order to easily distinguish from when light 320 is emitted to the inside of the light guide plate 190 (FIG. 7), for convenience, as shown in FIG. 8(b), an image displayed in the display panel 120 can be omitted.

Figure 9:
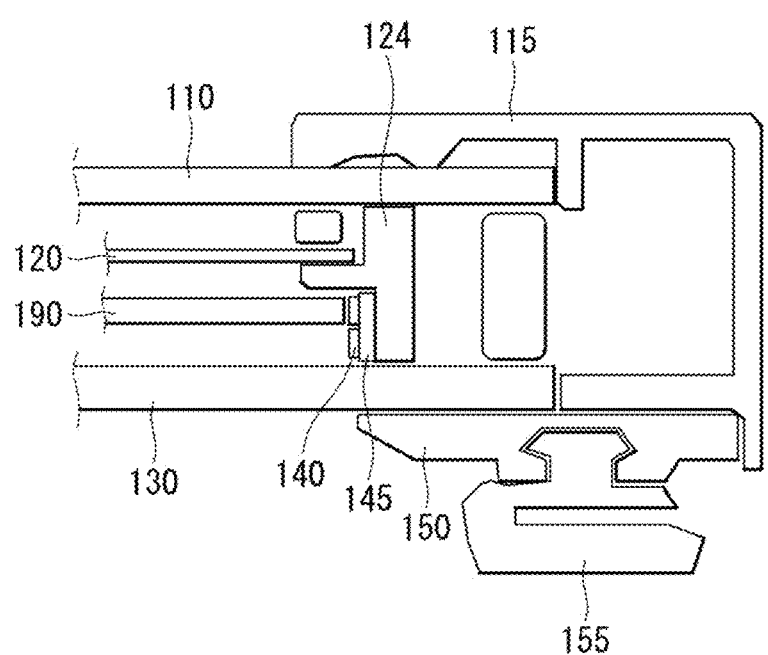

Next, FIGS. 9 to 17 are views illustrating an electronic device according to an embodiment of the present invention. Referring to FIG. 9, the light source 140 is located at a corner area of the light guide plate 190. Further, the light source 140 may be separated into at least two areas on the substrate 145 of one side surface of a lower portion of a protruded portion of the guide panel 124.

For example, the light source 140 may be classified into a light source 140 of an area that emits light toward the light guide plate 190 and a light source 140 of an area that does not emit light toward the light guide plate 190. That is, the light source 140 may be classified into an area that emits light in order to determine a shape within the main body and an area that emits light to make difficult to determine a shape within the main body.

The electronic device may further include a controller that inputs a control signal to the electronic device. The controller can be driven to perform an operation or a function of the electronic device. Specifically, by driving an application program stored at the electronic device, the controller 410 can provide appropriate information or function to the user.

The controller can also operate the light source 140 of at least one area by an instruction. For example, the controller can drive the light source 140 of an area that emits light toward the light guide plate 190. In this instance, it is difficult to easily determine a shape within the main body 10 other than an image of the display panel 120. Alternatively, the controller can drive the light source 140 of an area that does not emit light toward the light guide plate 190. In this instance, a shape within the main body can be determined.

Figure 10:
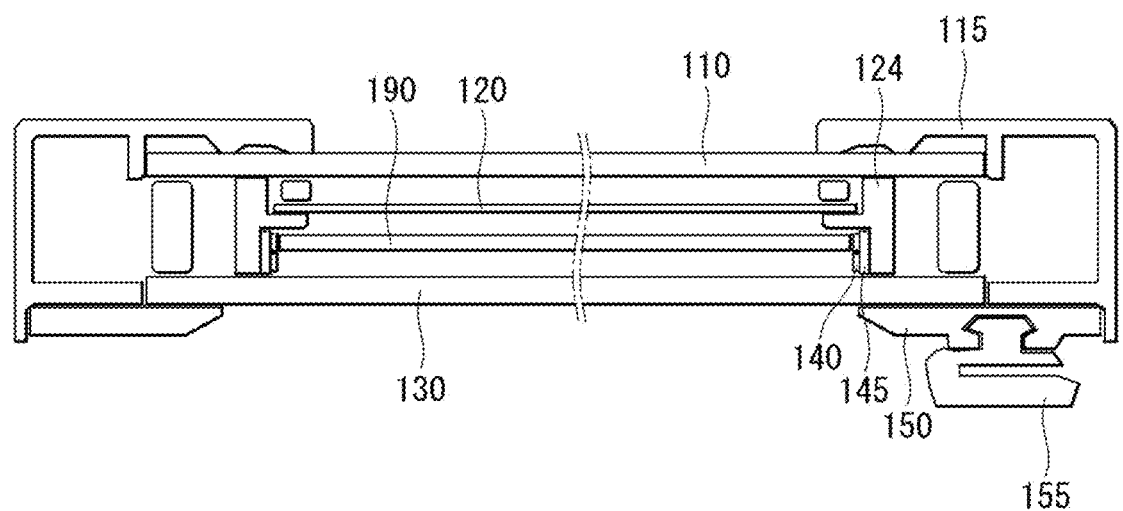

Referring to FIG. 10, the light source 140 can be located at both ends of the display panel 120. In this instance, an image of the display panel 120 and/or a shape within the main body can be determined more clearly than when the light source 140 exists at one side of the display panel 120.

When the controller drives the light source 140 of an area that emits light toward the light guide plate 190, it may be difficult to determine a shape within the main body. That is, because a large amount of light quantity is emitted to the inside of the light guide plate 190, light reflected at the inside of the main body is relatively reduced.

Figure 11:
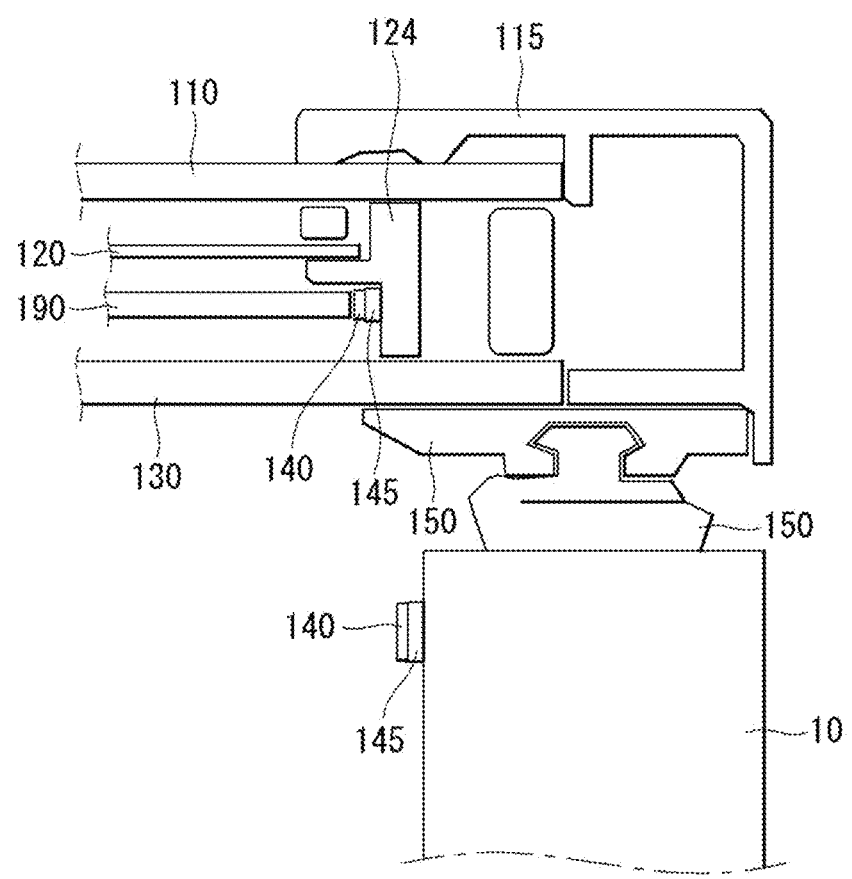

Referring to FIG. 11, at least a portion of the light source 140 can be located at the outside of the observation window 40. Specifically, at least a portion of the light source 140 can be located at a side surface of the main body 10. Further, the controller can drive a light source within the observation window 40. In this instance, it may be difficult to easily determine a shape within the main body 10 other than an image of the display panel 120. Alternatively, the controller can drive the light source 140 within the main body. In this instance, both an image of the display panel 120 and a shape within the main body can be determined.

In the electronic device according to an embodiment of the present invention, at least a partial light source 140 is located at the outside of the protection glass or observation window 40. Accordingly, when a user opens a door of the electronic device, the user can easily determine a material stored at the inside.

Figure 12:
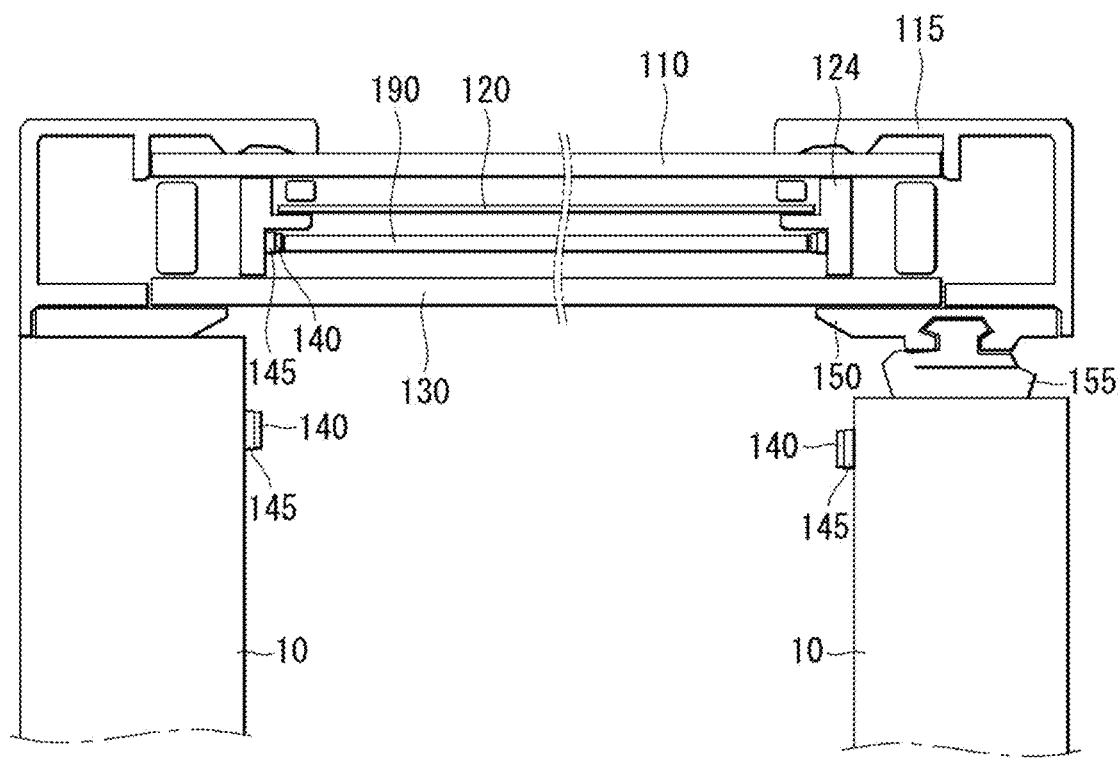

Referring to FIG. 12, the internal light source 140 and the external light source 140 of the observation window 40 can be located at both ends of the display panel 120. In this instance, an image of the display panel 120 and a shape within the main body can be determined more clearly than when the light source 140 exists at one side of the display panel 120.

When the controller drives the internal light source 140 of the observation window 40, it may be difficult to determine a shape within the main body. That is, because a large amount of light quantity is emitted to the inside of the light guide plate 190, light reflected at the inside of the main body 10 is relatively reduced. Alternatively, when the controller drives the external light source 140 of the observation window 40, even if a peripheral environment is dark, the light sources 140 exist at both sides and thus a material within the main body 10 can be more easily determined.

Figure 13:
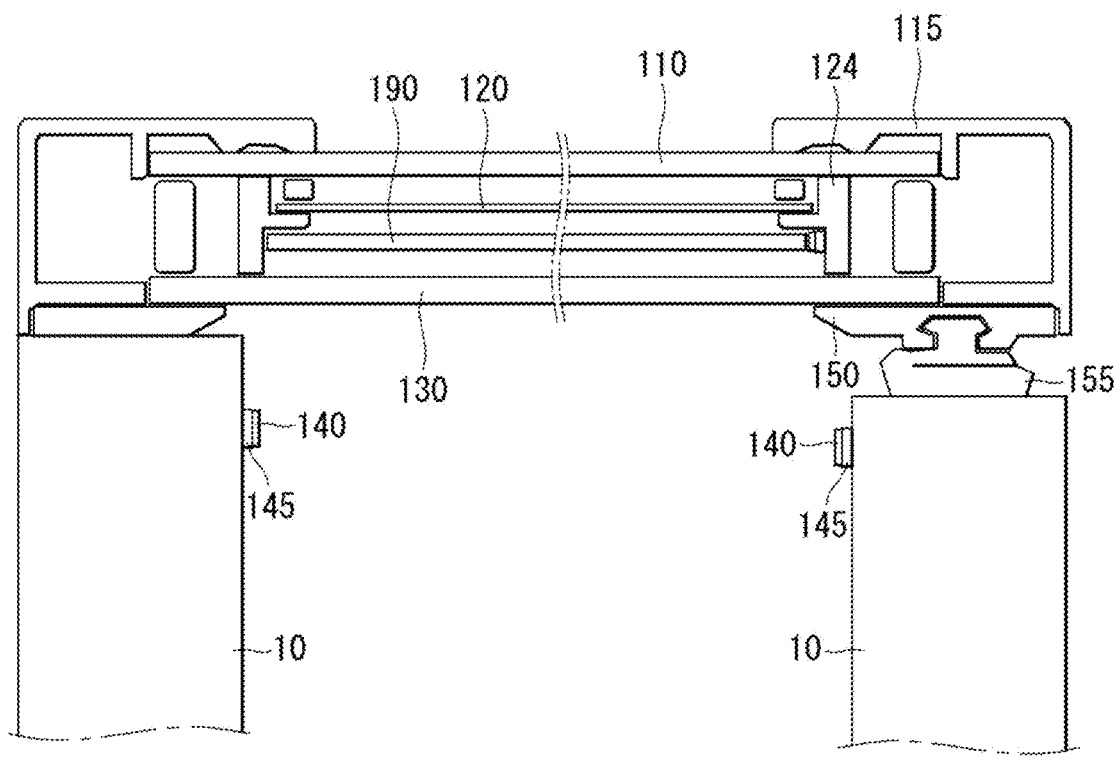

Referring to FIG. 13, the internal light source 140 of the observation window 40 may be located at only one side of the display panel 120, and the external light source 140 of the observation window 40 may be located at both ends of the display panel 120. In this instance, when the controller drives the internal light source 140 of the observation window 40, it may be difficult to easily determine a shape within the main body 10 other than an image of the display panel 120.

Alternatively, when the controller drives the external light source 140 of the observation window 40, even if a peripheral environment is dark, the light sources 140 exist at both sides and thus a material within the main body 10 can be more easily determined. Further, because the external light sources 140 of the observation window 40 exist at both sides, a significant amount of light can advance toward the display panel 120. Accordingly, when the controller drives the external light source 140 of the observation window 40, both an image of the display panel 120 and a shape within the main body can be more clearly determined.

Figure 14:
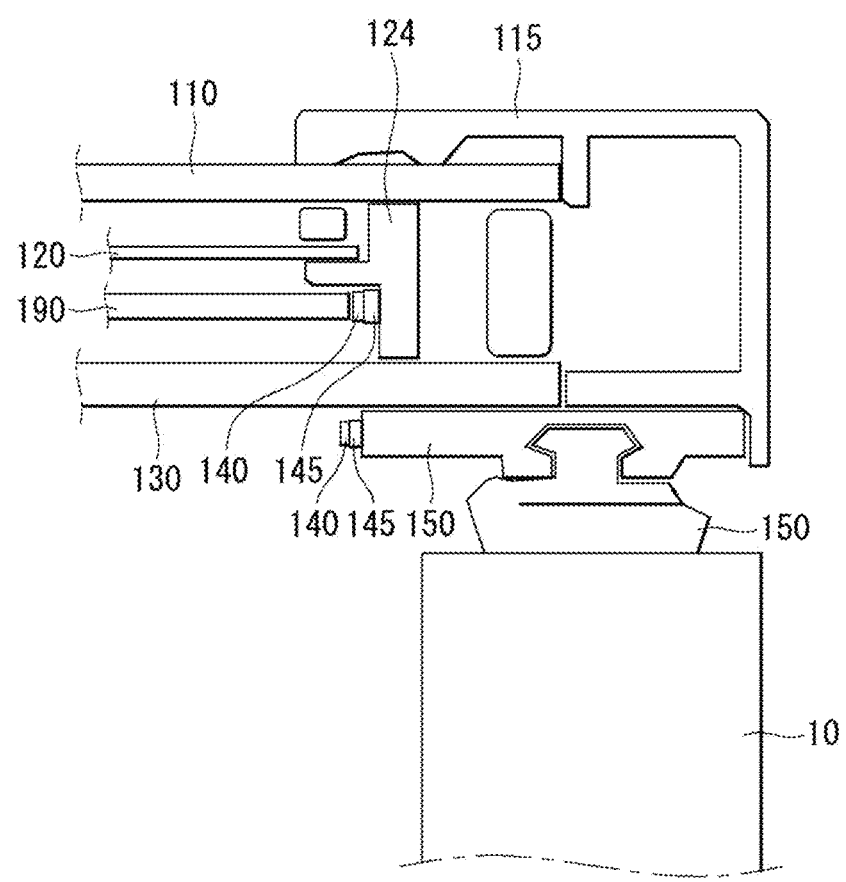

Referring to FIG. 14, at least a portion of the light source 140 may be located at the outside of the observation window 40. For example, at least a portion of the light source 140 may be located at a side surface of the rear frame 150. In this instance, at least a portion of the light source 140 may be located more adjacent to the observation window 40 than when at least a portion of the light source 140 is located at the main body 10. Accordingly, at the outside of the observation window 40, a shape within the main body 10 can be more easily determined.

Figure 15:
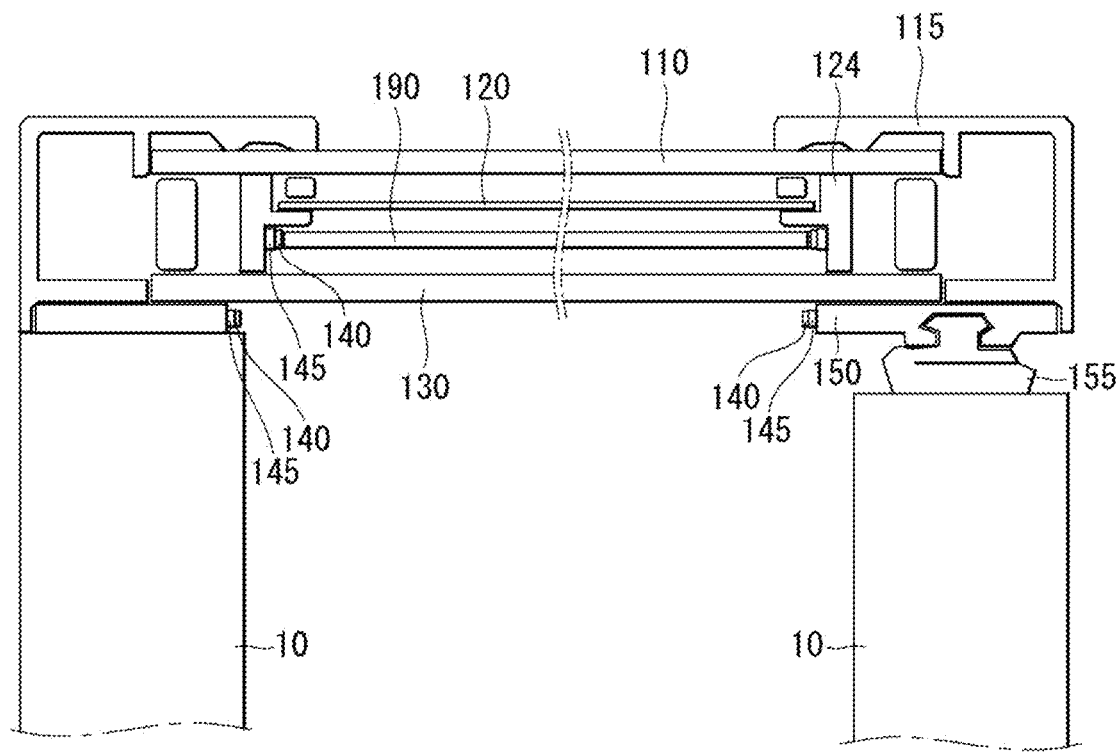

Referring to FIG. 15, the light source 140 within the observation window 40 and the light source 140 of the rear frame 150 may be located at both ends of the display panel 120. In this instance, an image of the display panel 120 and/or a shape within the main body 10 can be determined more clearly than when the light source 140 exists at one side of the display panel.

Figure 16:
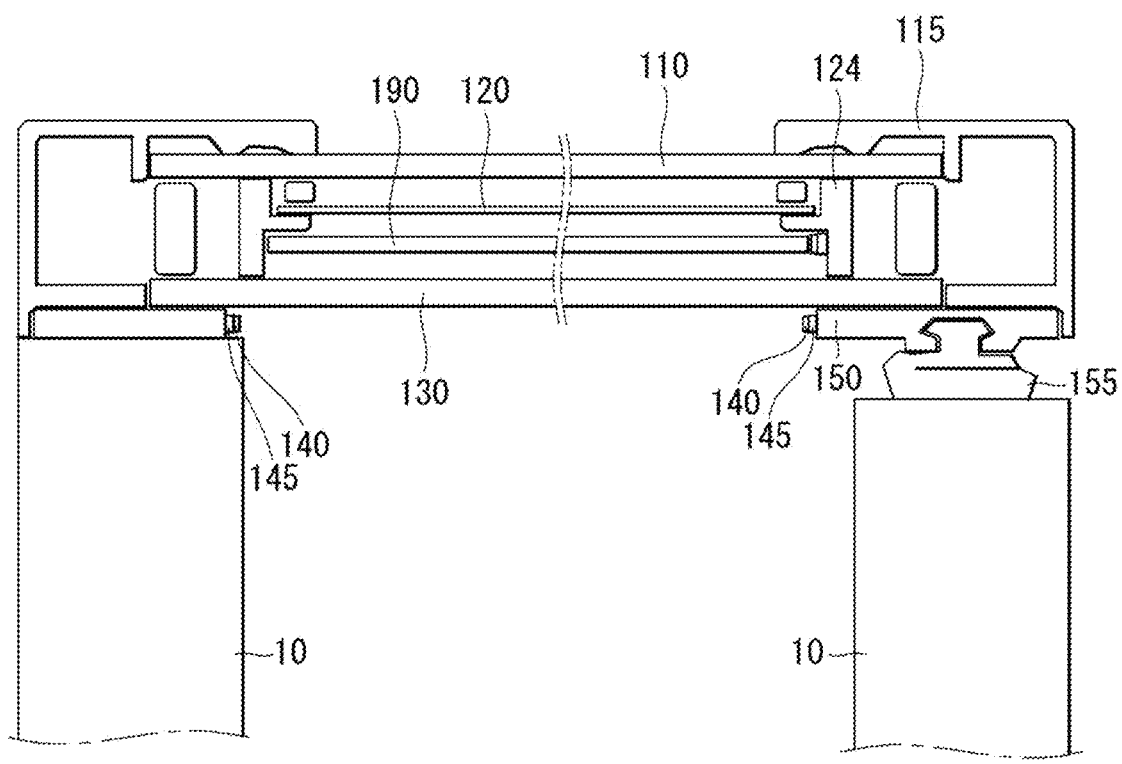

Referring to FIG. 16, the internal light source 140 of the observation window 40 may be located at only one side of the display panel 120, and the light source 140 of the rear frame 150 may be located at both ends of the display panel 120. In this instance, when the controller drives the internal light source 140 of the observation window 40, it may be difficult to easily determine a shape within the main body 10 other than an image of the display panel 120. Alternatively, when the controller drives the light source 140 of the outside of the observation window 40, even if a peripheral environment is dark, the light sources 140 exist at both sides and thus a material within the main body 10 can be more easily determined.

Figure 17:
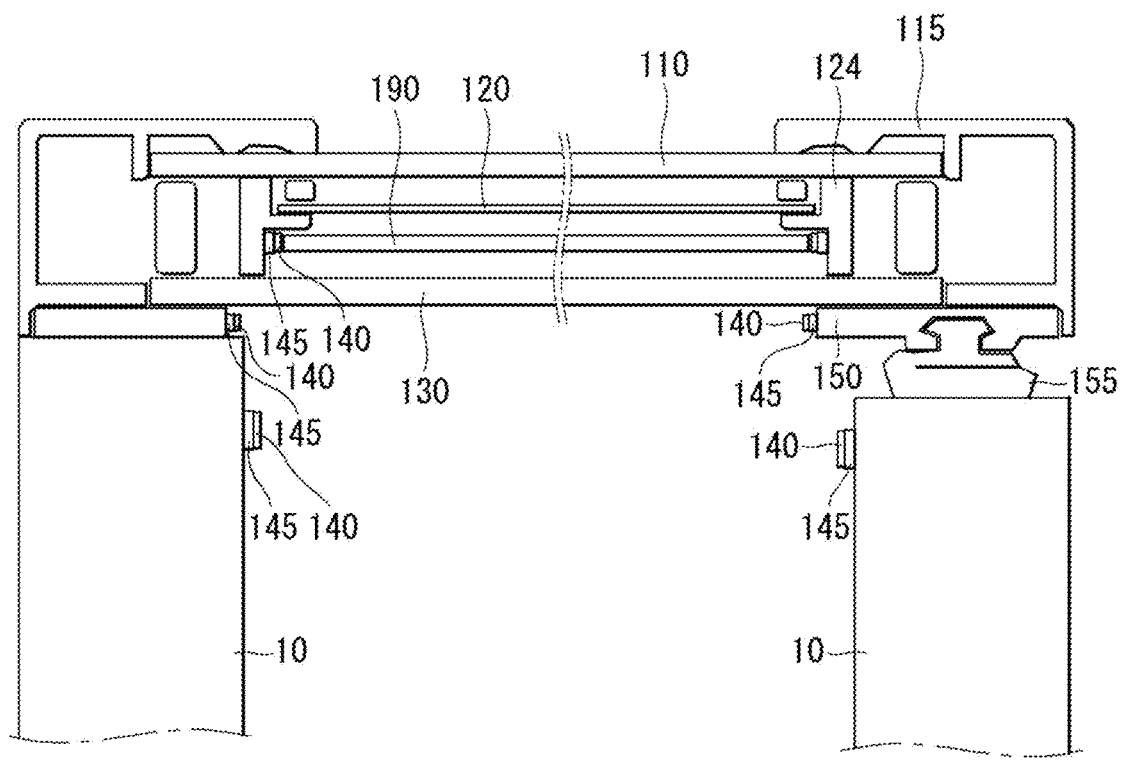

Referring to FIG. 17, the light source 140 may be located at the inside of the observation window 40, the rear frame 150, and the inside of the main body 10. The light source 140 located at the inside of the observation window 40, the rear frame 150, and the inside of the main body 10 may be located at both ends of the display panel 120. In this instance, at the inside of the main body 10 as well as at the rear frame 150 of the outside of the observation window 40, the light sources 140 may be located. Accordingly, when the controller 410 drives an external light source of the observation window 40, a material within the main body 10 may be more easily determined.

Figure 18:
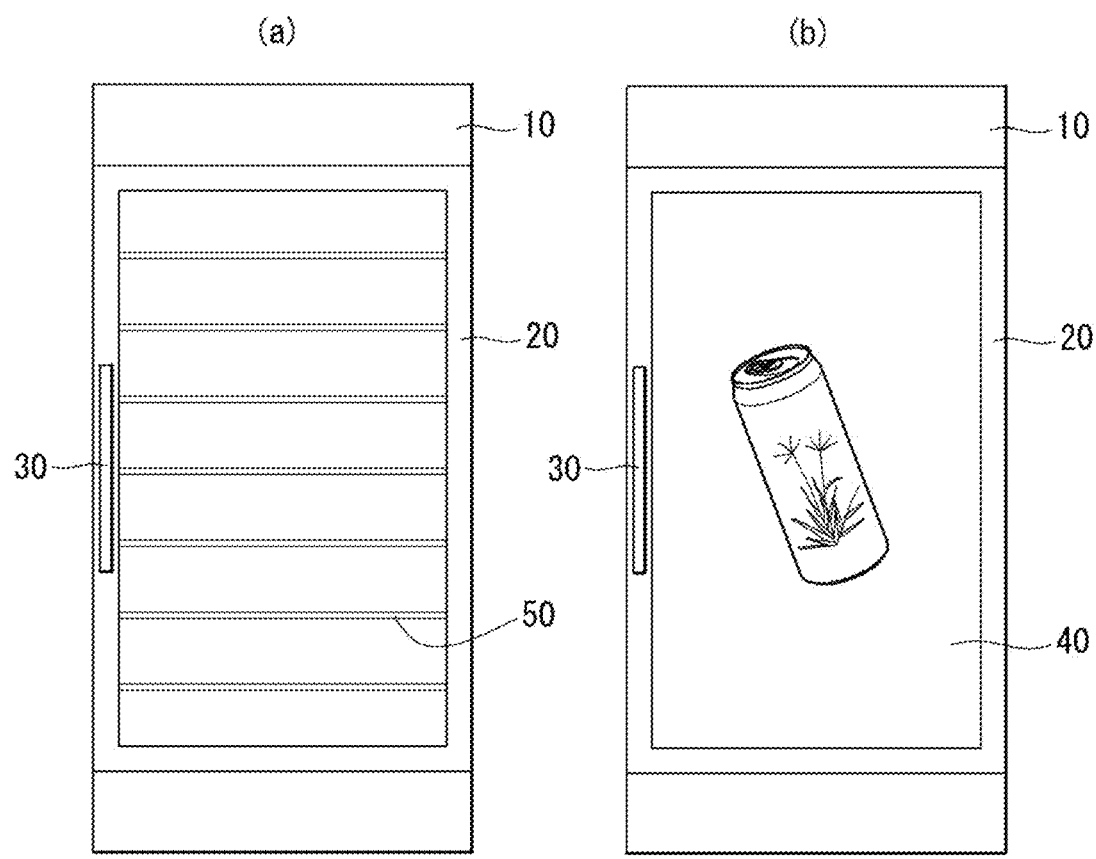
FIGS. 18 to 32 are views illustrating an electronic device according to an embodiment of the present invention.

Next, FIGS. 18 to 32 are views illustrating an electronic device according to an embodiment of the present invention. Referring to FIG. 18(*a*), when light of a light source is not emitted to the inside of the light guide plate, an image of the display panel and/or a shape within the main body can be determined. However, in FIG. 18(*a*), as described in relation to FIG. 7, an image of the display panel is omitted.

Referring to FIG. 18(*b*), when light of a light source is emitted to the inside of the light guide plate, only an image of the display panel is displayed. In this instance, the user can more concentratively view an advertisement displayed in the display panel.

Figure 19:
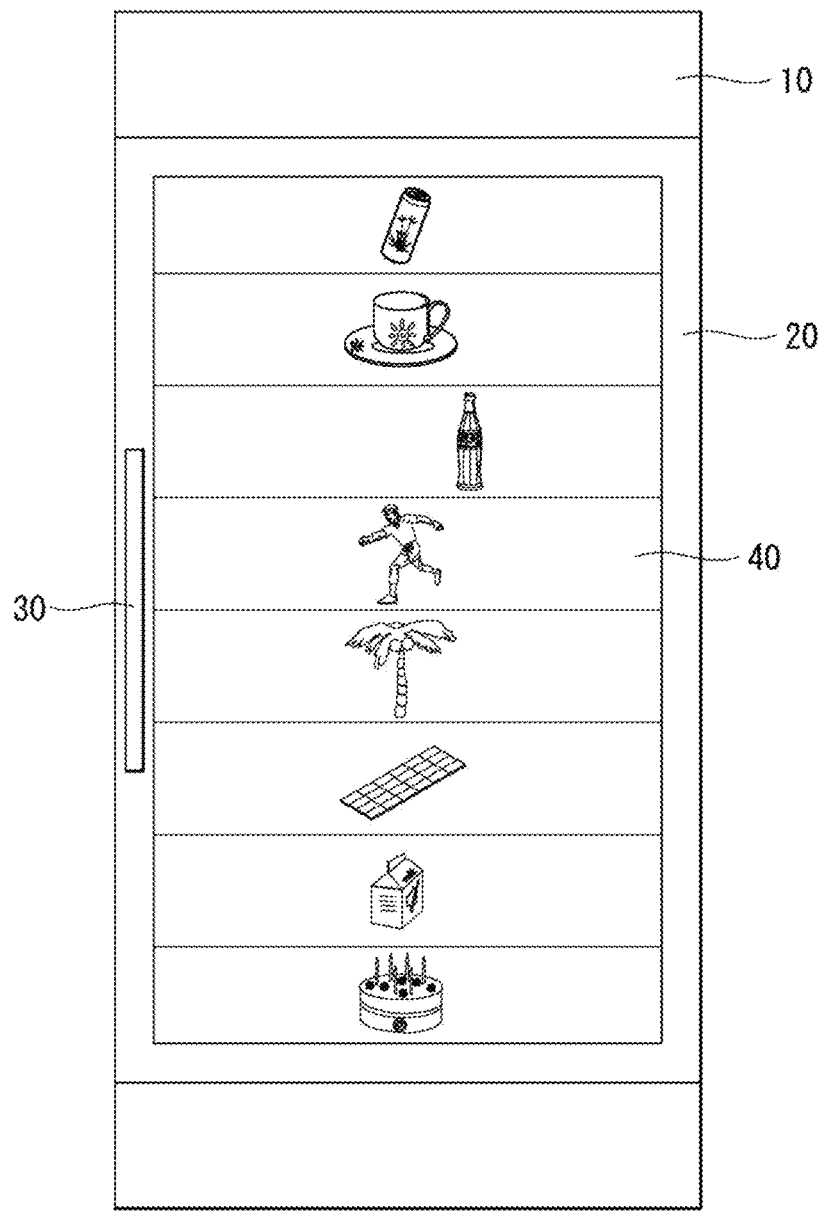

Referring to FIG. 19, a plurality of images can be displayed within one observation window 40. For example, an image representing contents according to a location of a shelf within the main body may be displayed at an area corresponding thereto. In this instance, the user can recognize contents according to a location without direct determination of contents within the main body.

Figure 20:
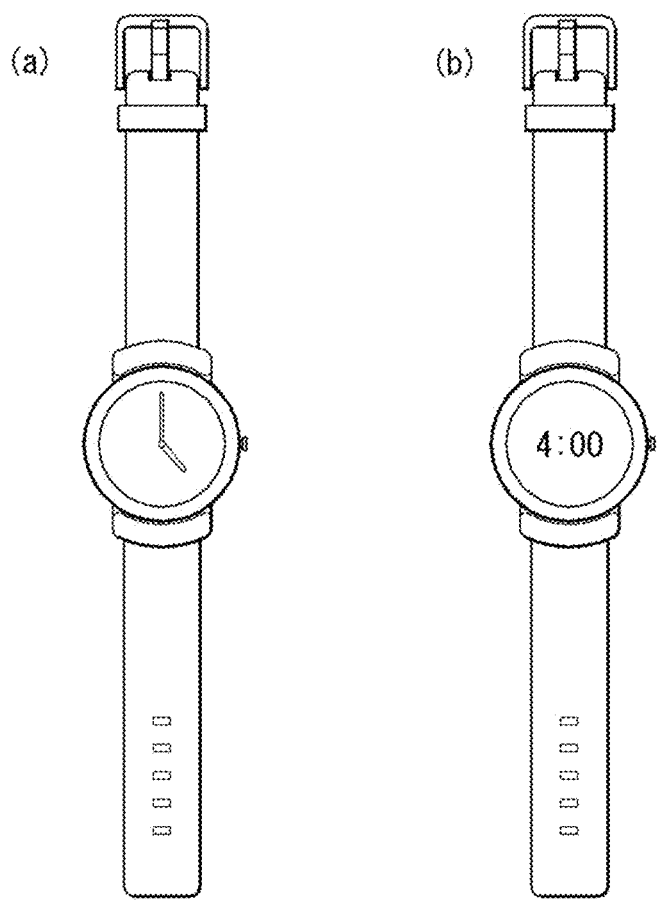

Referring to FIG. 20, the electronic device may be a watch type electronic device. As shown in FIG. 20(*a*), at a normal time, an analog type watch located at the rear side of the display panel can be displayed. That is, an hour hand and a minute hand can be displayed on a screen.

Alternatively, as shown in FIG. 20(*b*), when light of a light source is emitted to the light guide plate, an analog type watch located at the rear side of the display panel is not displayed, but a digital type watch displayed in the display panel is displayed. That is, a time can be displayed by the numeral on the screen.

The electronic device according to an embodiment of the present invention can display a watch of a type in which a user wants on the screen. Accordingly, the user can more conveniently obtain time information. Further, by selecting a watch of a type excellent in a design, an aesthetic feeling can be enhanced.

Figure 21:
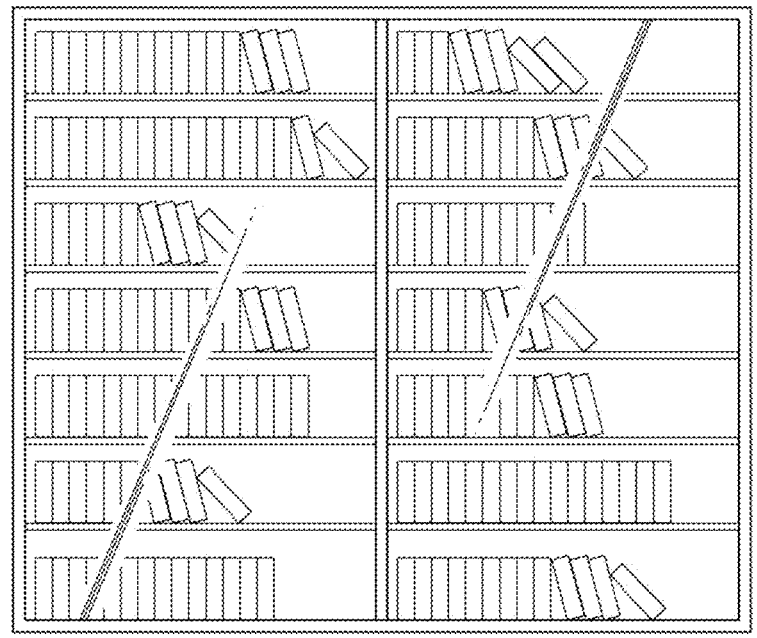
Figure 21:
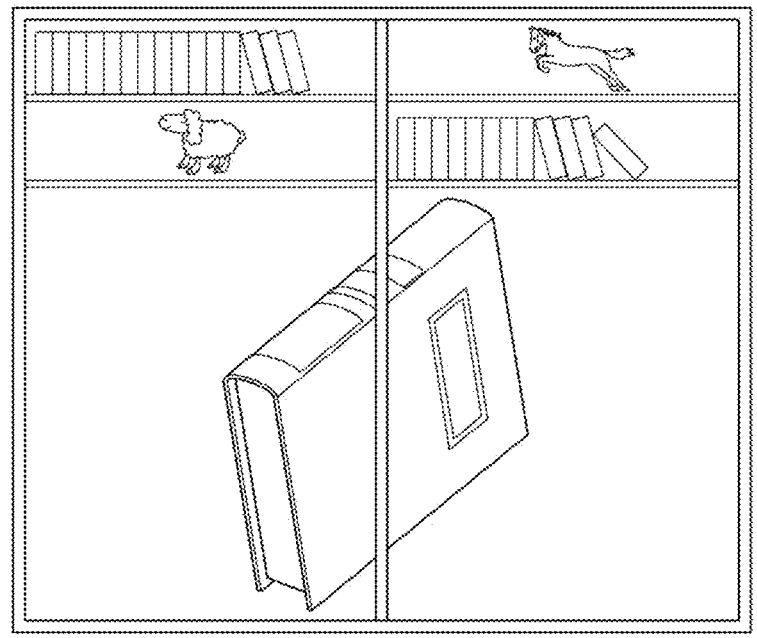

Referring to FIG. 21, the electronic device according to an embodiment of the present invention may be a device to which a display panel is applied to glass located at a bookshelf or a building. As shown in FIG. 21(*a*), at a normal time, an internal book or a shape within a building can be displayed.

Alternatively, as shown in FIG. 21(*b*), when light of a light source is emitted to the light guide plate, an image is displayed on the display panel. An image displayed on the display panel can be displayed as a plurality of images or a single image. Because the electronic device according to an embodiment of the present invention can display an image of the display panel at the outside of a bookshelf or a building, an aesthetic feeling can be provided to the user.

Figure 22:
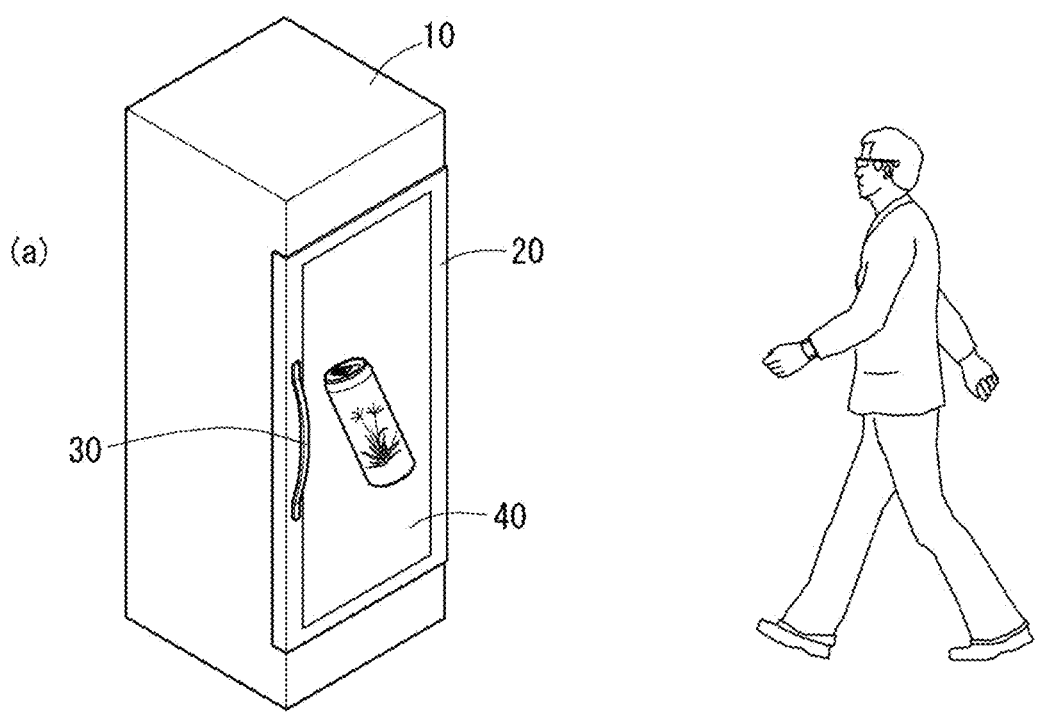
Figure 22:
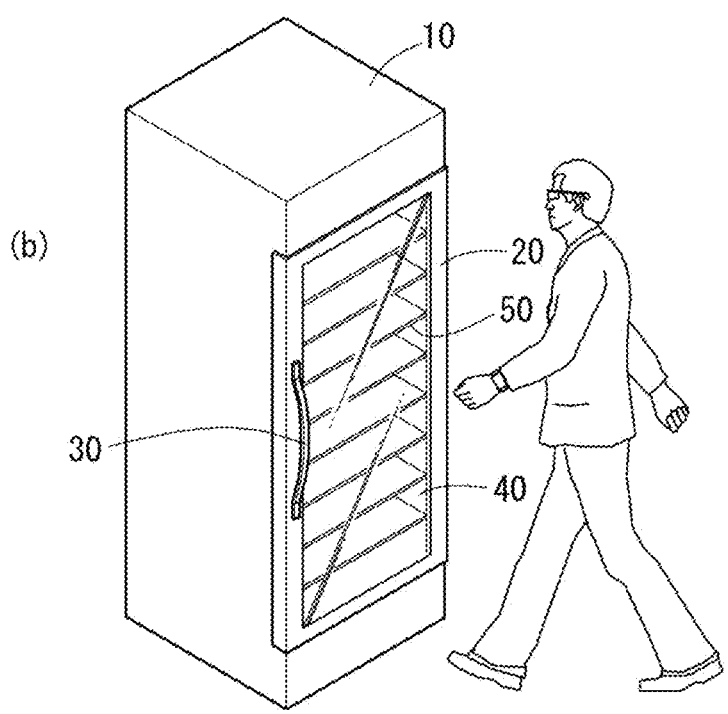

Referring to FIG. 22, at a front surface of the electronic device, a detection sensor is located. As shown in FIG. 22(*a*), when the user is separated far from the electronic device, light of a light source can be emitted toward a side surface of the light guide plate of the electronic device. Accordingly, the user can view only an image of the display panel. Because an object within the main body is not viewed by the user, the user can concentrate to an image of the display panel.

As shown in FIG. 22(*b*), when the user approaches a front surface of the electronic device, the detection sensor may recognize the user. When the detection sensor recognizes the user, the controller can control light of a light source not to emit toward a side surface of the light guide plate. Accordingly, the user can see a display image and/or an internal state of the main body.

Figure 23:
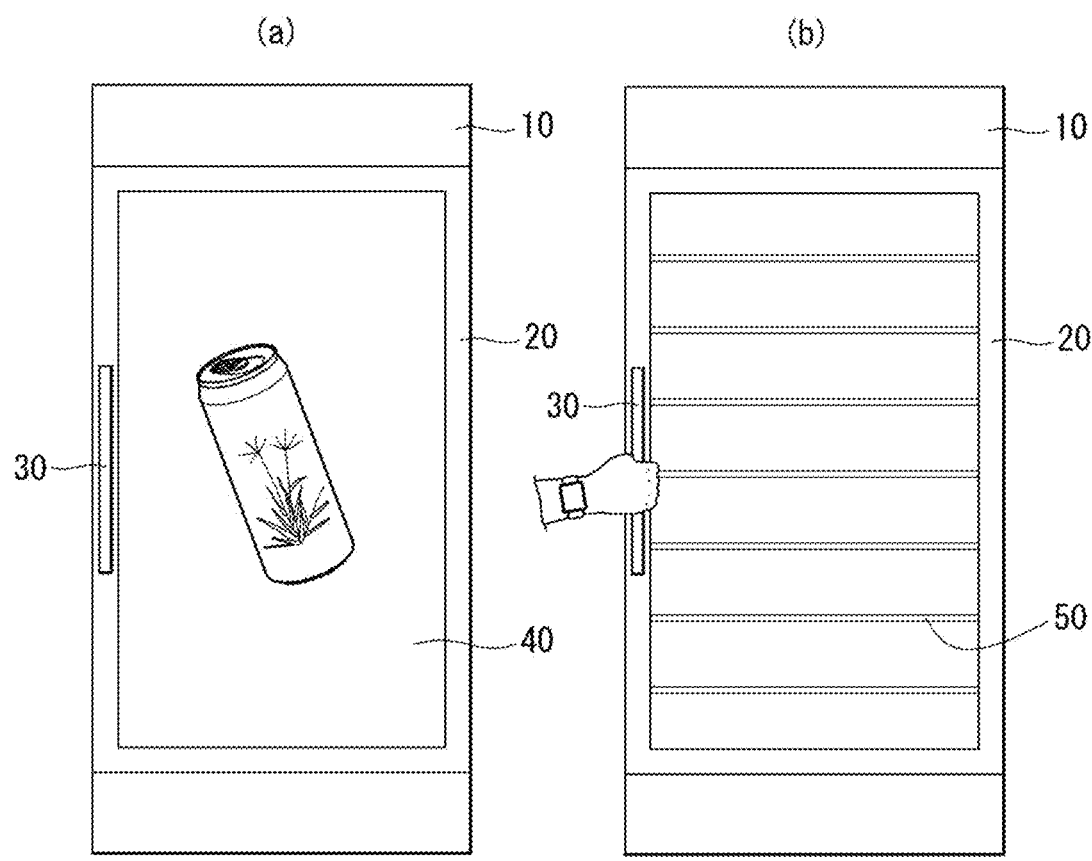

Referring to FIG. 23, a detection sensor is located at the handle 30 of the electronic device. As shown in FIG. 23(*a*), when the user is separated far from the electronic device, light of a light source can be emitted toward a side surface of the light guide plate of the electronic device. Accordingly, the user can view only an image of the display panel. Because an object within the main body is not viewed by the user, the user can concentrate at an image of the display panel.

As shown in FIG. 23(*b*), when the user touches the handle 30 of the electronic device, the controller can control light of the light source not to emit toward a side surface of the light guide plate. Accordingly, the user can see a display image and/or an internal state of the main body.

Figure 24:
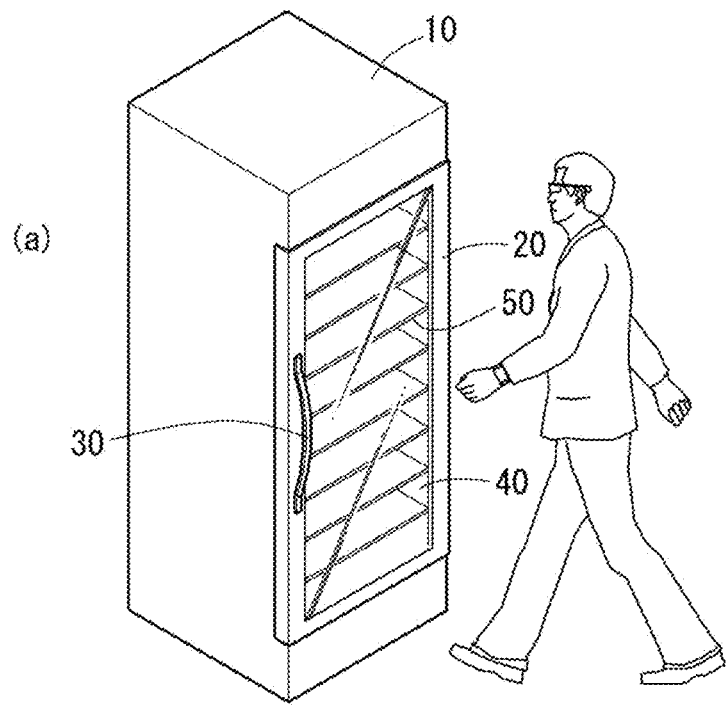
Figure 24:
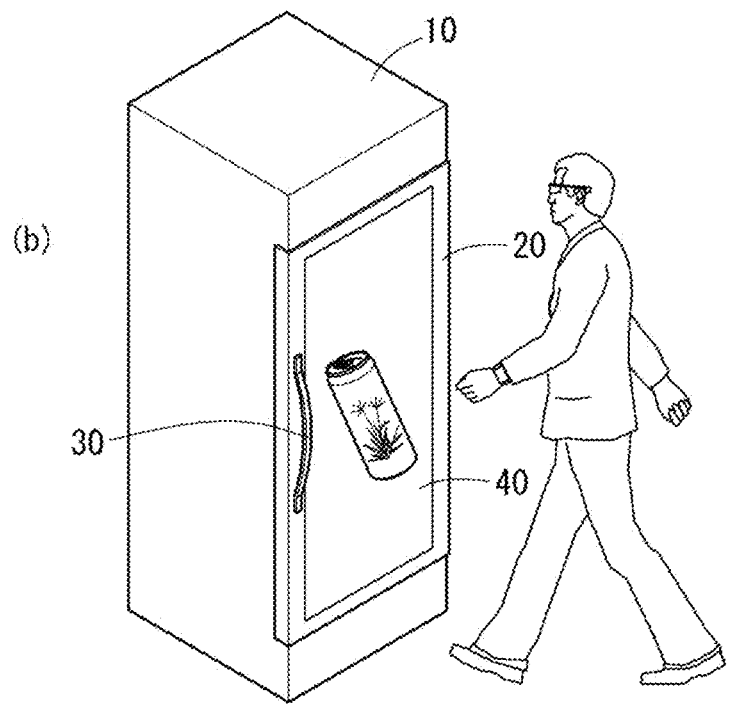

As shown in FIG. 24(*a*), when the user approaches a front surface of the electronic device, the detection sensor can recognize the user. Accordingly, the controller can control light of the light source not to emit toward a side surface of the light guide plate. That is, the controller can control an external light source of the observation window to emit light. Accordingly, the user can view an internal state of the main body.

As shown in FIG. 24(*b*), when the user approaches a front surface of the electronic device and stands by for a predetermined time or more, the controller can turn off an external light source of the observation window and control to emit light of the light source toward a side surface of the light guide plate. Accordingly, the user can view an image of the display panel. When something approaches a front surface of the electronic device and does not move for a predetermined time or more (e.g., an object instead of a user), the controller 410 can stop showing a state within the main body and control to display advertisement on the display panel.

Figure 25:
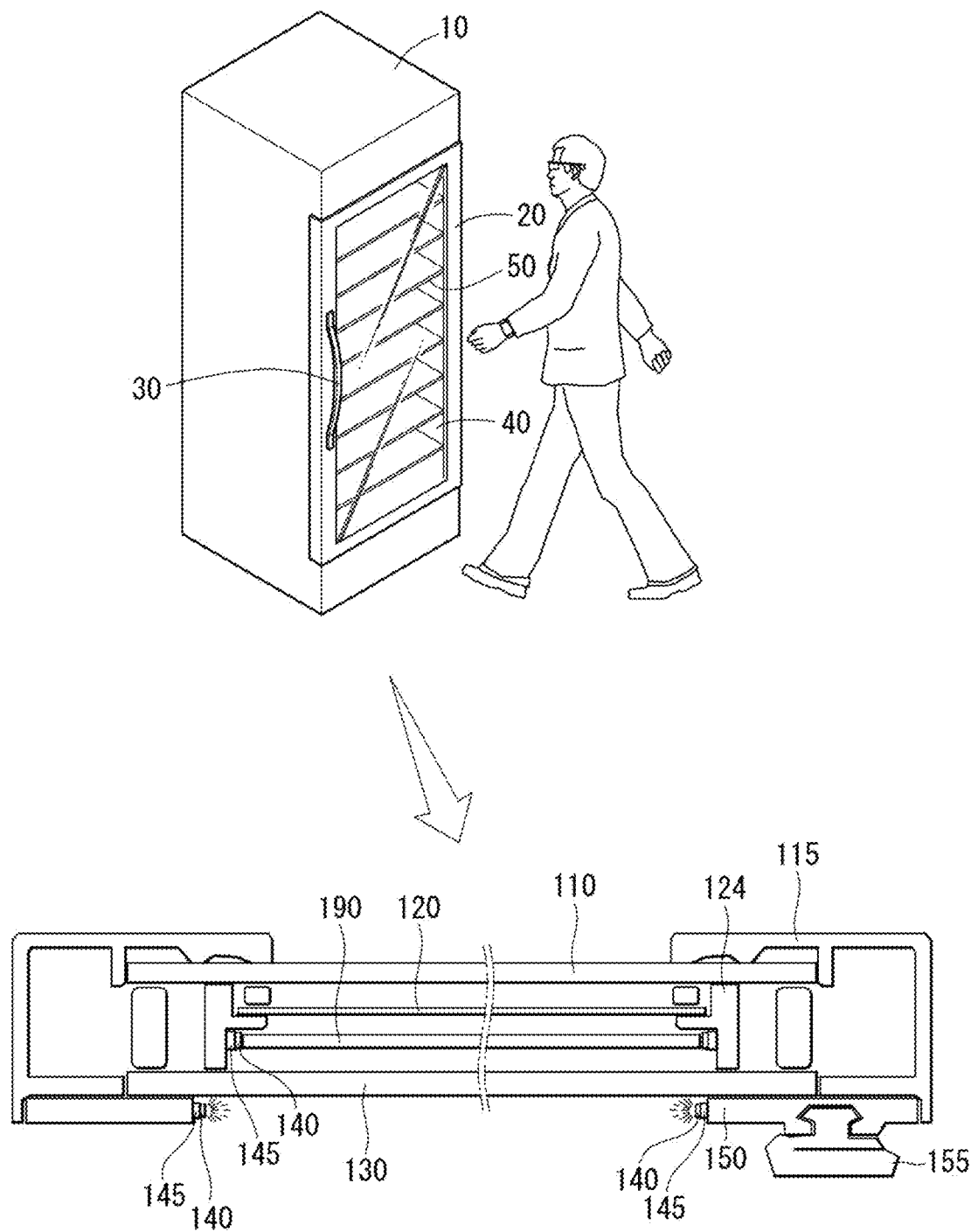
Figure 26:
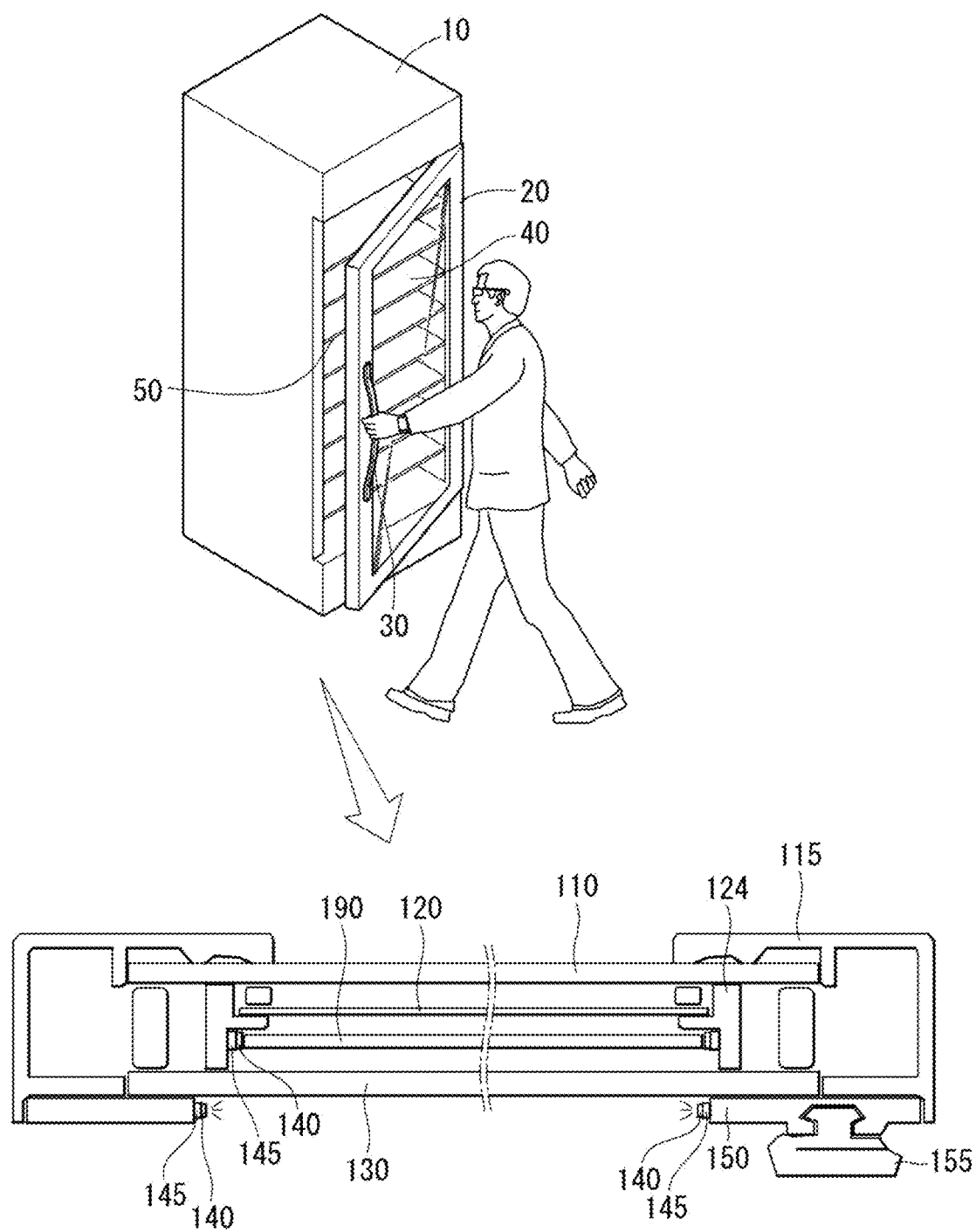

Referring to FIGS. 25 and 26, the brightness of the external light source 140 of the observation window 40 when the user opens the door 20 may be less than that of the external light source 140 of the observation window 40 when the user approaches a front surface of the electronic device. For example, the brightness of the external light source 140 of the observation window 40 when the user opens the door 20 may be smaller by 5% or more than that of the external light source 140 of the observation window 40 when the door 20 is closed. Because the brightness of the light source 140 located at the outside of the observation window 40 when the user opens the door 20 reduces, when the user opens the door 20, a glare phenomenon is reduced.

Figure 27:
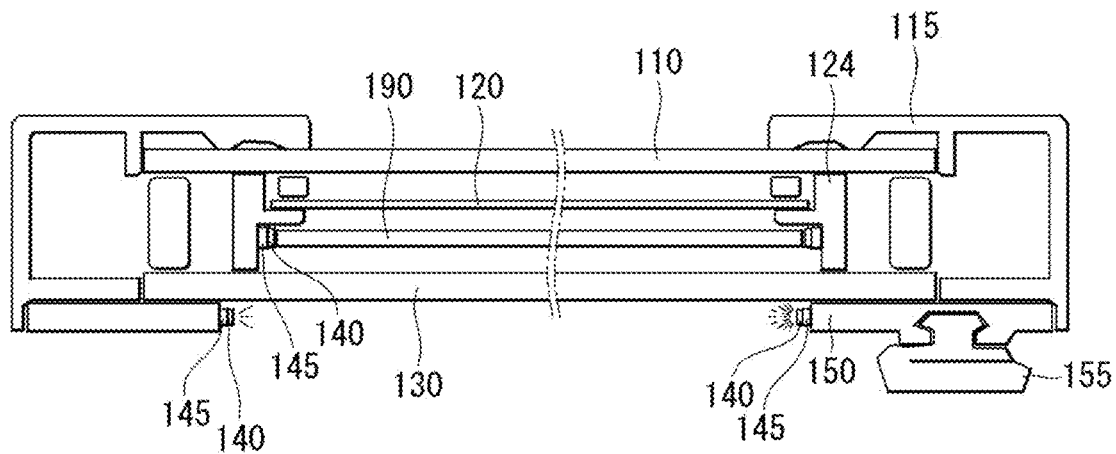

Referring to FIG. 27, when the user opens the door, the brightness of the light source 140 located at both ends of the outside of the observation window may be different. For example, the light source 140 located at the opposite side of an area adjacent to the rubber gasket 155 may be bright less than the light source 140 located at the adjacent area.

When the user opens the door, the light source 140 located at the opposite side of an area adjacent to the rubber gasket 155 can emit light toward a user eye. Accordingly, in order to prevent user glare, when the user opens the door, the light source 140 located at the opposite side of an area adjacent to the rubber gasket 155 may be less bright.

Figure 28:
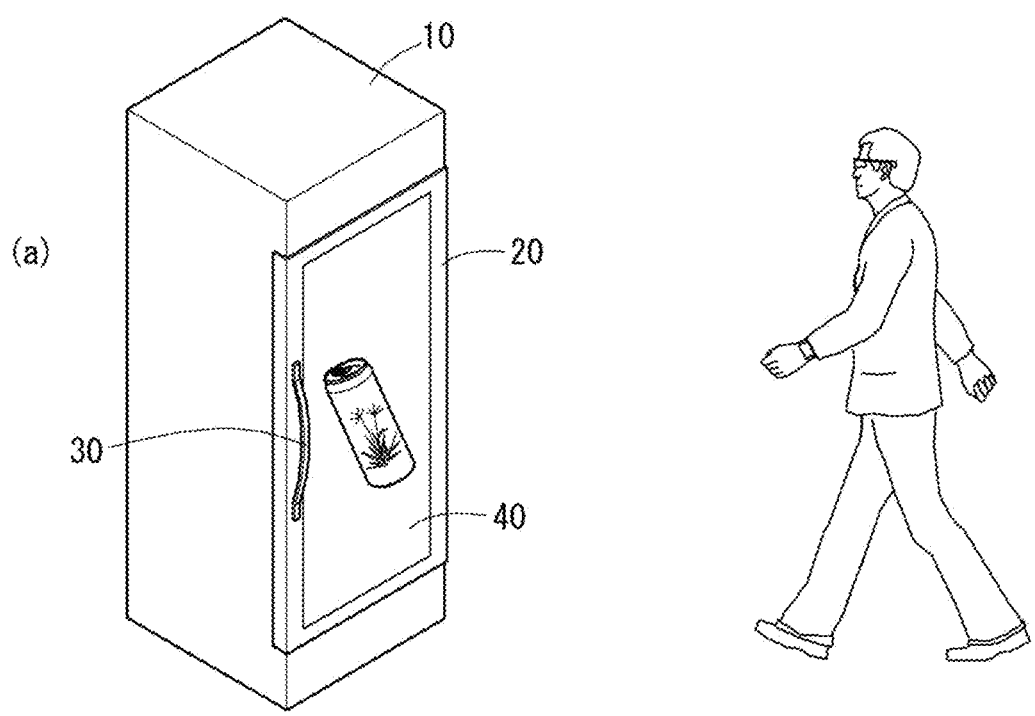
Figure 28:
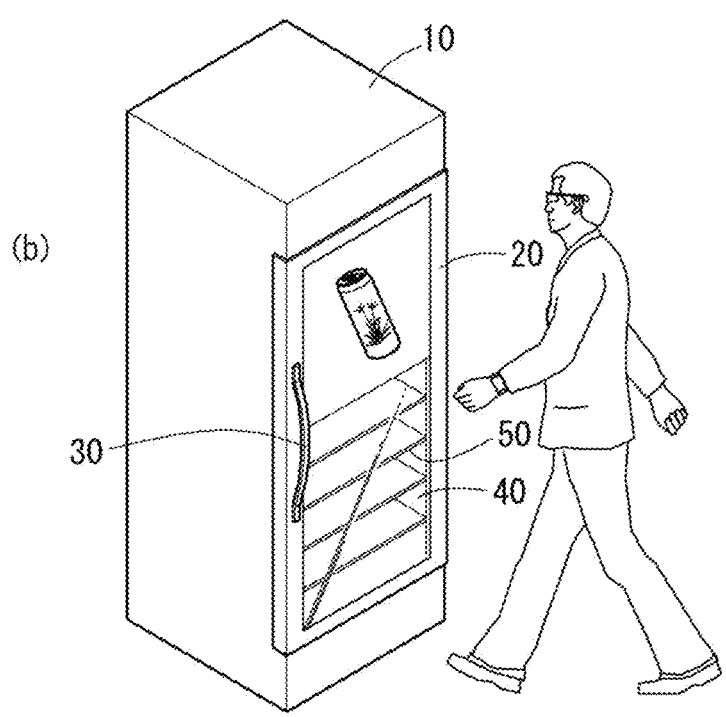

Referring to FIGS. 28(*a*) and 28(*b*), when the user approaches a front surface of the electronic device, only a partial image of the display panel may be displayed. That is, an image of the display panel may be displayed in a portion of the observation window 40, and a shape within the main body 10 may be displayed in other portions of the observation window 40. In this instance, when the user approaches a front surface of the electronic device, there is a merit that the user can simultaneously determine an image of the display panel and contents within the main body.

Figure 29:
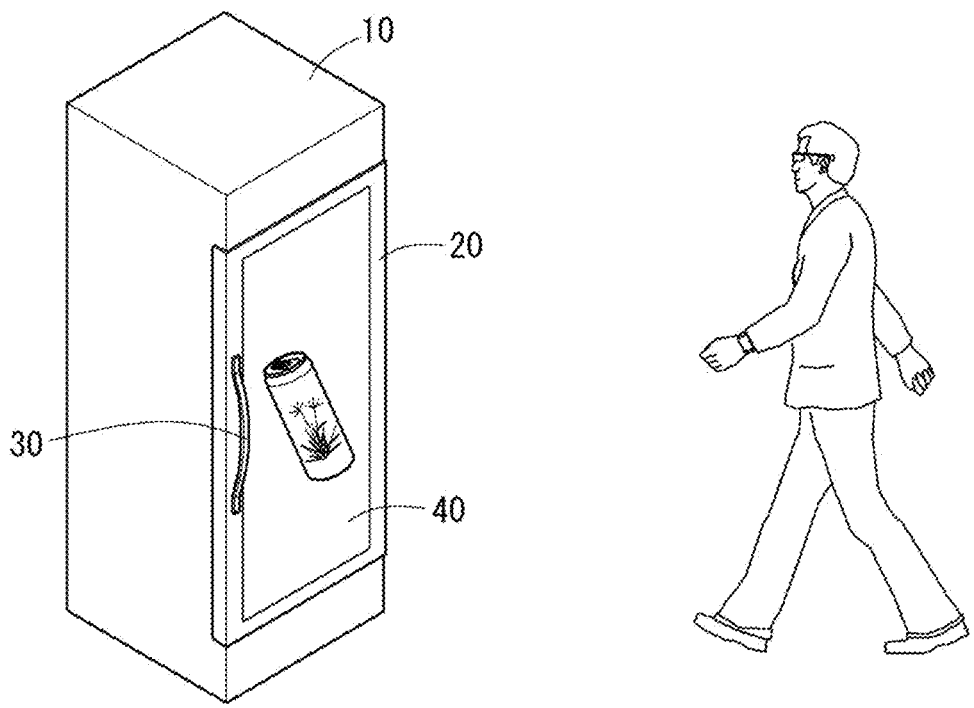
Figure 29:
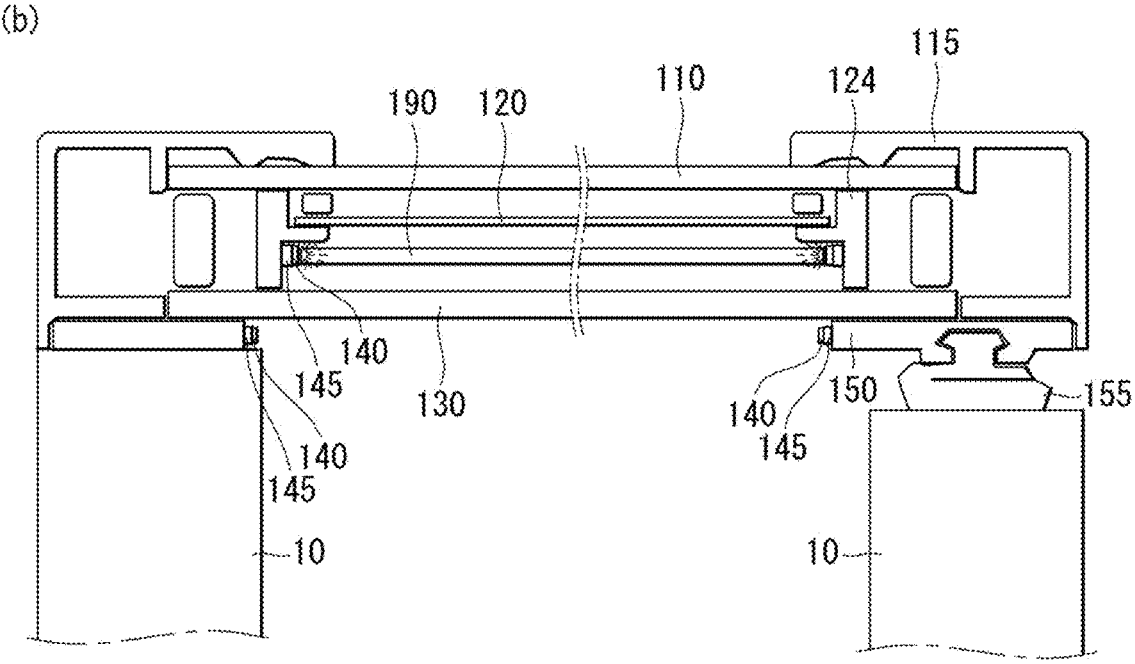
Figure 30:
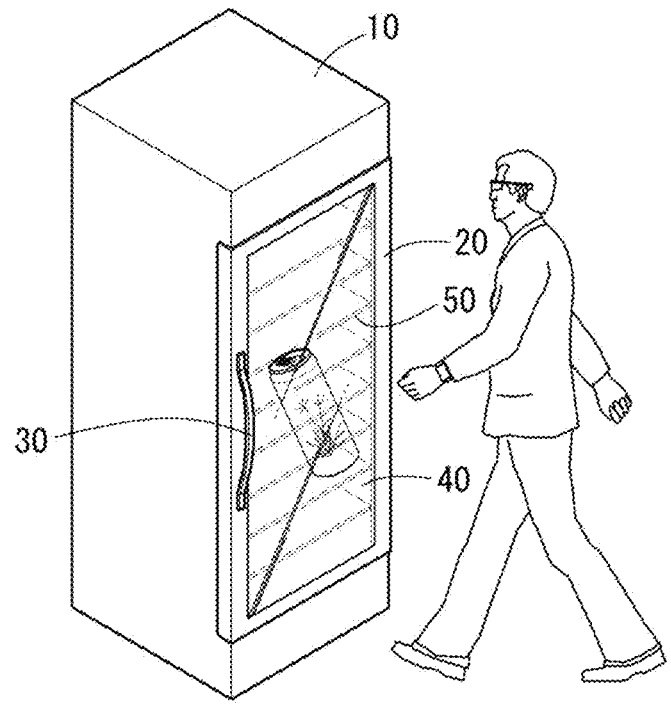
Figure 30:
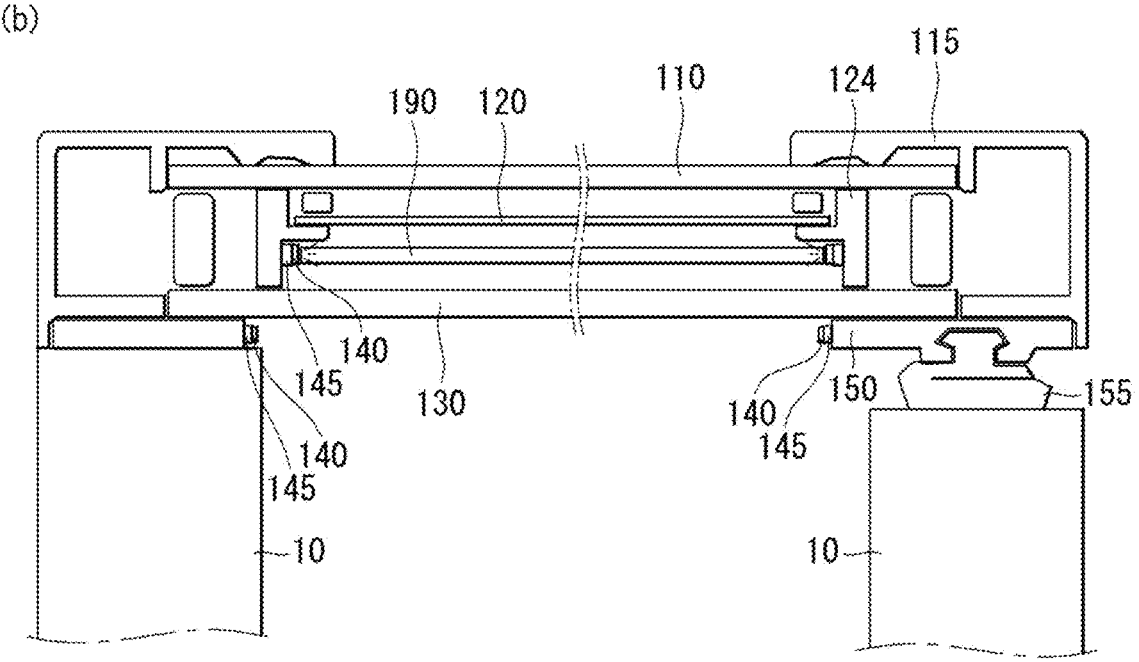

Referring to FIGS. 29 and 30, the brightness of the internal light source 140 of the observation window 40 when the user approaches a front surface of the electronic device may be lower than that of the internal light source 140 of the observation window 40 when the user is separated from the electronic device. That is, when the user approaches a front surface of the electronic device, an image of the display panel may become dim. For example, the brightness of the internal light source 140 of the observation window 40 when the user approaches a front surface of the electronic device may be lower by 10% or more than that of the internal light source 140 of the observation window 40 when the user is separated from the electronic device.

When the user approaches a front surface of the electronic device, if an image of the display panel becomes dim, a shape within the main body 10 may be more clearly represented. That is, there is a merit that an image of the display panel and an internal shape of the main body 10 may be simultaneously displayed.

Figure 31:
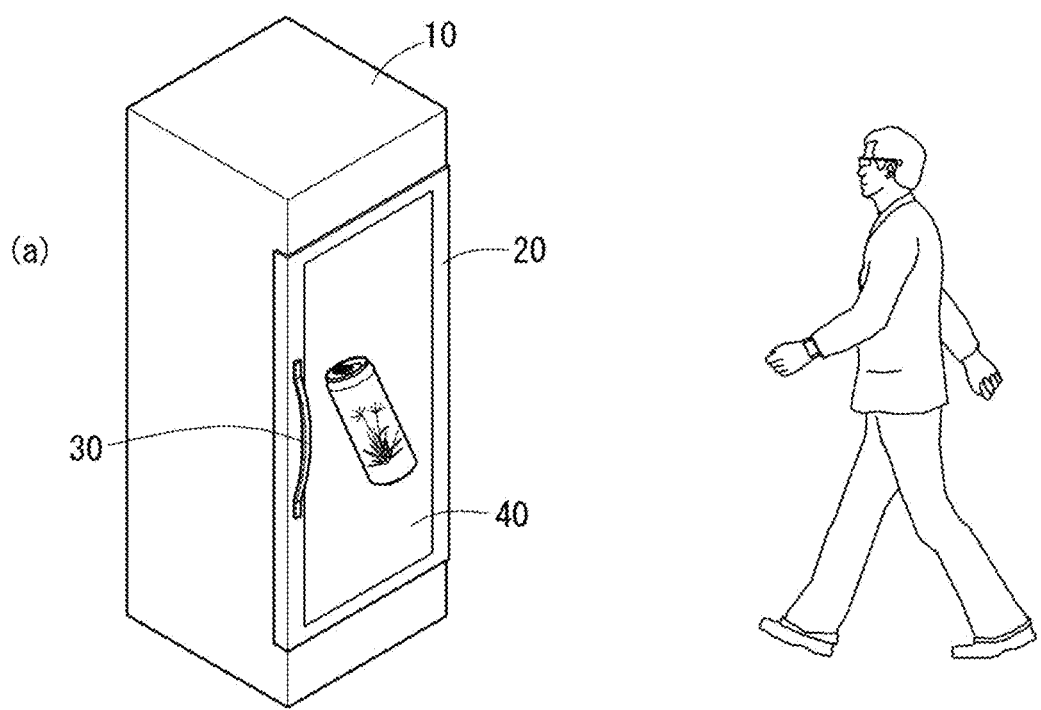
Figure 31:
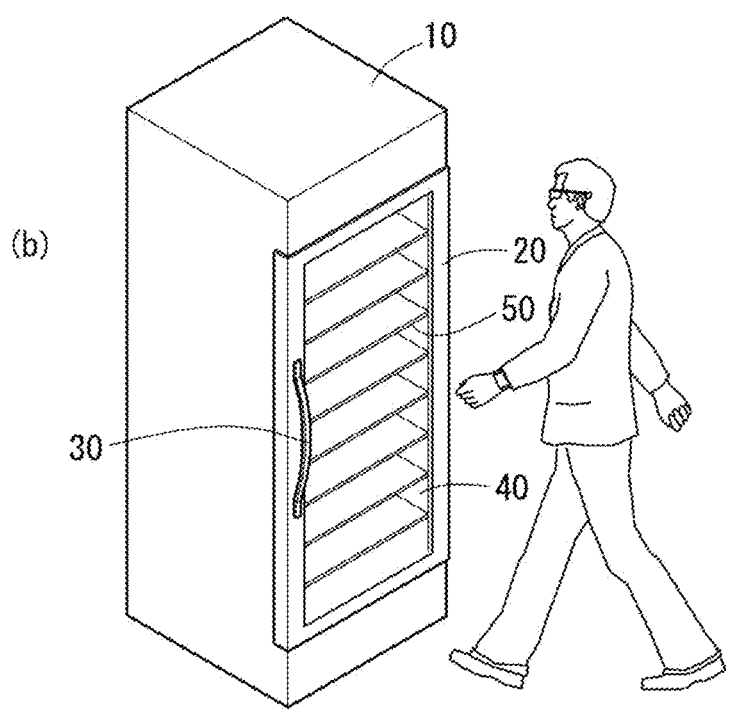

Referring to FIG. 31, when the user approaches a front surface of the electronic device, an entire image of the display panel may be changed to a while color. In this instance, even when the user approaches a front surface of the electronic device, an internal light source of the observation window 40 can continue to emit light. In a portion in which an image of the display panel is a white color, a shape within the main body 10 may be shown to the user differently from other colors. Accordingly, when an entire image of the display panel is changed to a while color, the user may determine a shape within the main body 10.

In the electronic device according to an embodiment of the present invention, even if the user approaches the electronic device, an internal light source of the observation window 40 may be maintained instead of being turned off. Accordingly, a failure of the electronic device can be reduced.

Figure 32:
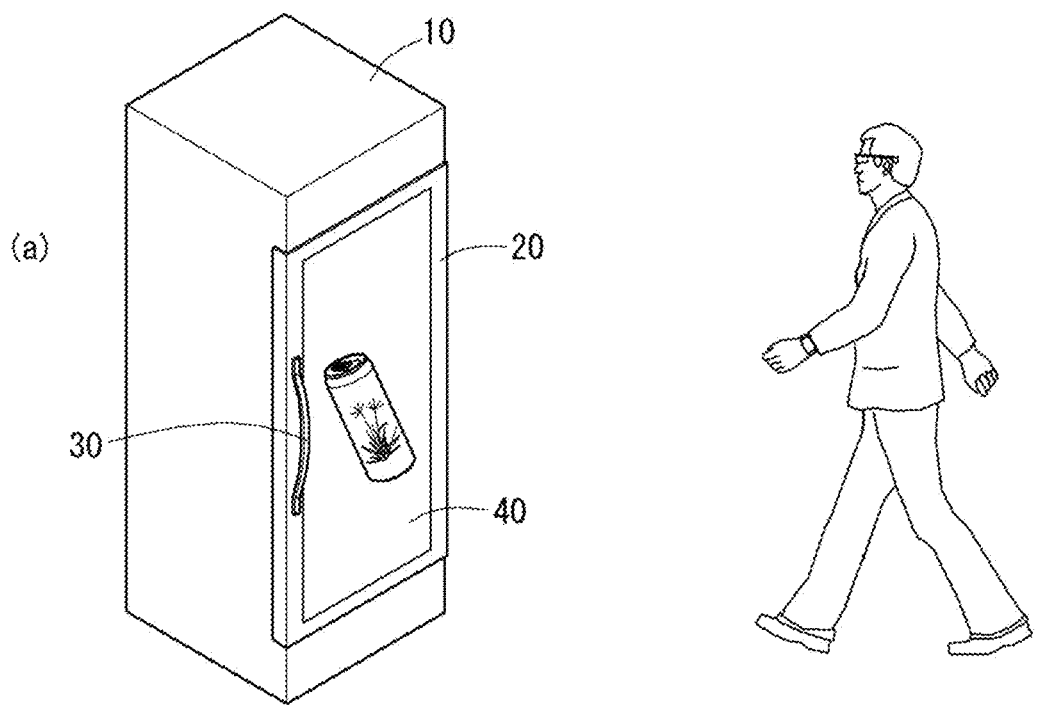
Figure 32:
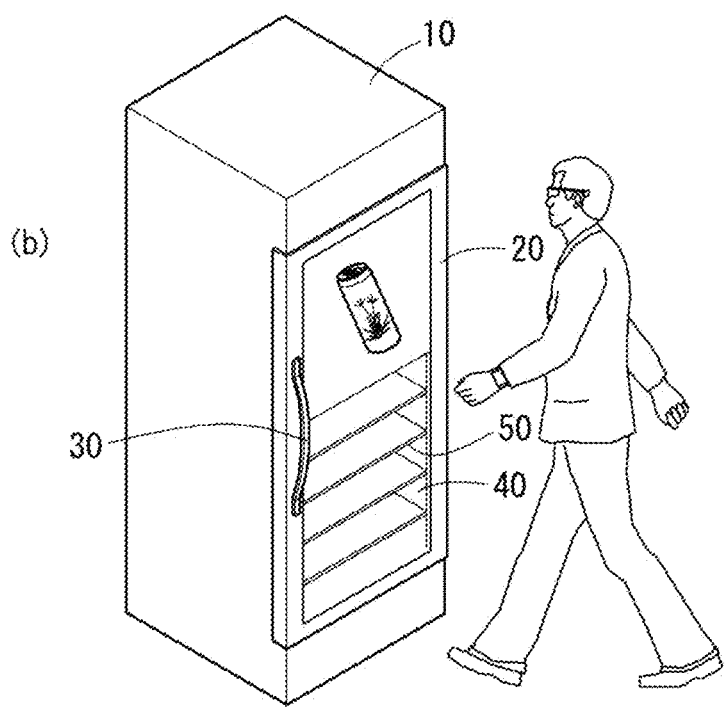

Referring to FIG. 32, when the user approaches a front surface of the electronic device, at least a portion of an image of the display panel may be changed to a while color. Accordingly, a portion of the observation window 40 may enable to determine contents within the main body 10 through a while color image of the display panel. In this instance, when the user approaches a front surface of the electronic device, there is a merit that the user can simultaneously determine an image of the display panel and contents within the main body.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
   a main body;
   a door attached to the main body;
   an observation window provided in at least a partial area of the door, the observation window including a display panel;
   at least one internal light source located within the observation window;
   at least one external light source located at an area outside of the observation window; and
   a controller configured to:
   operate a first state to turn on the at least one internal light source such that an image displayed on the display panel is viewable from an outside of the electronic device,
   operate a second state to turn on the at least one external light source such that an inside of the electronic device is viewable from the outside of the electronic device, and
   operate a brightness of the at least one external light source when a user opens the door to be darker than a brightness of the at least one external light source when the user approaches a front surface of the electronic device.

2. The electronic device of claim 1, wherein the controller is further configured to change the first state to the second state when an object approaches the observation window.

3. The electronic device of claim 2, wherein the controller is further configured to change the second state to the first state when the object, having approached the observation window, does not move while a predetermined time has elapsed.

4. An electronic device, comprising:
   a main body;
   a door attached to the main body;
   an observation window provided in at least a partial area of the door, the observation window including a display panel;
   at least one internal light source located within the observation window;
   external light sources located at both ends of an area outside of the observation window; and
   a controller configured to:
   operate a first state to turn on the at least one internal light source such that an image displayed on the display panel is viewable from an outside of the electronic device, operate a second state to turn on the external light sources such that an inside of the electronic device is viewable from the outside of the electronic device, and operate a brightness of the external light sources at both ends of the outside of the observation window to be different than each other when a user opens the door.

5. The electronic device of claim 4, wherein the controller is further configured to change the first state to the second state when an object approaches the observation window.

6. The electronic device of claim 5, wherein the controller is further configured to change the second state to the first state when the object, having approached the observation window, does not move while a predetermined time has elapsed.

7. An electronic device, comprising:
a main body;
a door attached to the main body;
an observation window provided in at least a partial area of the door, the observation window including a display panel;
at least one internal light source located within the observation window;
at least one external light source located at an area outside of the observation window; and
a controller configured to:
operate a first state to turn on the at least one internal light source such that an image displayed on the display panel is viewable from an outside of the electronic device,
operate a second state to turn on the at least one external light source such that an inside of the electronic device is viewable from the outside of the electronic device, and
operate the display panel so that an image of the display panel is displayed in a portion of the observation window and a shape within the main body is displayed in other portions of the observation window when a user approaches a front surface of the electronic device.

8. The electronic device of claim 7, wherein the controller is further configured to change the first state to the second state when an object approaches the observation window.

9. The electronic device of claim 8, wherein the controller is further configured to change the second state to the first state when the object, having approached the observation window, does not move while a predetermined time has elapsed.

* * * * *